United States Patent
Woo et al.

(10) Patent No.: US 10,242,398 B2
(45) Date of Patent: Mar. 26, 2019

(54) INTEGRATING THIRD PARTY SHOPPING CART APPLICATIONS WITH AN ONLINE PAYMENT SERVICE

(71) Applicant: PAYPAL, INC., San Jose, CA (US)

(72) Inventors: Katherine Woo, San Francisco, CA (US); Deborah Yee-Ky Liu, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 282 days.

(21) Appl. No.: 14/981,505

(22) Filed: Dec. 28, 2015

(65) Prior Publication Data

US 2016/0110798 A1 Apr. 21, 2016

Related U.S. Application Data

(63) Continuation of application No. 13/470,032, filed on May 11, 2012, now abandoned, which is a
(Continued)

(51) Int. Cl.
*G06Q 30/00* (2012.01)
*G06Q 30/06* (2012.01)
*G06Q 20/12* (2012.01)

(52) U.S. Cl.
CPC ......... *G06Q 30/0633* (2013.01); *G06Q 20/12* (2013.01); *G06Q 30/06* (2013.01); *G06Q 30/0613* (2013.01); *G06Q 30/0641* (2013.01)

(58) Field of Classification Search
CPC .................................................. G06Q 30/00
See application file for complete search history.

(56) References Cited

U.S. PATENT DOCUMENTS

| | | | |
|---|---|---|---|
| 5,963,925 | A | 10/1999 | Kolling et al. |
| 5,966,697 | A | 10/1999 | Fergerson et al. |

(Continued)

FOREIGN PATENT DOCUMENTS

| | | |
|---|---|---|
| WO | WO 2007062185 A2 | 5/2007 |
| WO | WO 2007062185 A3 | 5/2007 |

OTHER PUBLICATIONS

Paypal1, "The Paypal Shopping Manual", published circa 2002 and updated Jan. 17, 2003 (Year: 2002).*

(Continued)

*Primary Examiner* — Mark A Fadok
(74) *Attorney, Agent, or Firm* — Haynes and Boone, LLP

(57) ABSTRACT

A method may include receiving at an online payment service hosted on a first system, detailed information from an auction management (AM) system, the AM system hosted on a second system remote from the first system. The information may concern an item purchased by a user from a network-based commerce facility and placed in a virtual shopping cart on the AM system. The detailed information may be sent by the AM system in response to receiving an intent to proceed with payment for the item. A user interface may be communicated to the user that facilitates processing of the payment for the item. The processing may include marking the payment as being an AM payment. The interface may allow the user to view the detailed information and the detailed information describing contents of the virtual shopping cart on the AM system.

20 Claims, 19 Drawing Sheets

Related U.S. Application Data continuation of application No. 10/791,156, filed on Mar. 1, 2004, now abandoned.

(60) Provisional application No. 60/520,173, filed on Nov. 14, 2003.

(56) References Cited

U.S. PATENT DOCUMENTS

| | | | |
|---|---|---|---|
| 5,973,692 A | 10/1999 | Knowlton et al. | |
| 6,141,006 A | 10/2000 | Knowlton et al. | |
| 6,304,855 B1* | 10/2001 | Burke | G06Q 10/087 235/383 |
| 6,405,176 B1 | 6/2002 | Toohey | |
| 6,519,571 B1 | 2/2003 | Guheen et al. | |
| 6,535,888 B1 | 3/2003 | Vijayan et al. | |
| 6,629,079 B1* | 9/2003 | Spiegel | G06Q 30/06 705/26.7 |
| 6,675,153 B1 | 1/2004 | Cook et al. | |
| 6,850,899 B1* | 2/2005 | Chow | G06Q 30/06 705/26.8 |
| 6,857,119 B1 | 2/2005 | Desai | |
| 6,925,444 B1 | 8/2005 | McCollom et al. | |
| 7,006,993 B1 | 2/2006 | Cheong et al. | |
| 7,034,953 B2 | 4/2006 | Silverbrook et al. | |
| 7,043,447 B2 | 5/2006 | Hughes et al. | |
| 7,069,234 B1 | 6/2006 | Cornelius et al. | |
| 7,107,226 B1 | 9/2006 | Cassidy et al. | |
| 7,188,081 B1 | 3/2007 | Shah | |
| 7,197,475 B1 | 3/2007 | Lorenzen et al. | |
| 7,328,176 B2 | 2/2008 | Tarvydas et al. | |
| 7,716,088 B2* | 5/2010 | Spiegel | G06Q 30/06 705/26.7 |
| 7,720,723 B2* | 5/2010 | Dicker | G06Q 30/02 705/14.51 |
| 7,877,295 B2 | 1/2011 | Mengerink et al. | |
| 7,912,756 B2* | 3/2011 | Spiegel | G06Q 30/06 705/26.8 |
| 2002/0010625 A1* | 1/2002 | Smith | G06Q 30/02 705/14.52 |
| 2002/0016765 A1 | 2/2002 | Sacks | |
| 2002/0019763 A1* | 2/2002 | Linden | G06Q 30/02 705/14.53 |
| 2002/0052806 A1 | 5/2002 | Hodson et al. | |
| 2002/0069139 A1 | 6/2002 | Bernstein et al. | |
| 2002/0099622 A1 | 7/2002 | Langhammer | |
| 2002/0103752 A1 | 8/2002 | Berger et al. | |
| 2002/0128935 A1 | 9/2002 | White et al. | |
| 2002/0133414 A1 | 9/2002 | Pradhan et al. | |
| 2002/0194087 A1* | 12/2002 | Spiegel | G06Q 30/06 705/26.7 |
| 2002/0198882 A1* | 12/2002 | Linden | G06F 17/30867 |
| 2003/0004816 A1 | 1/2003 | Beyers, Jr. et al. | |
| 2003/0069812 A1 | 4/2003 | Yuen et al. | |
| 2003/0078991 A1 | 4/2003 | Harris | |
| 2003/0105710 A1 | 6/2003 | Barbara et al. | |
| 2003/0210279 A1 | 11/2003 | Masuda | |
| 2004/0117293 A1 | 6/2004 | Lammle et al. | |
| 2004/0205006 A1 | 10/2004 | Kanai | |
| 2004/0215572 A1 | 10/2004 | Uehara et al. | |
| 2004/0254855 A1 | 12/2004 | Shah | |
| 2005/0108104 A1 | 5/2005 | Woo | |
| 2005/0114223 A1 | 5/2005 | Schneider | |
| 2006/0190389 A1 | 8/2006 | Molloy | |
| 2007/0078727 A1* | 4/2007 | Spiegel | G06Q 30/06 705/26.8 |
| 2007/0100706 A1 | 5/2007 | Raccah et al. | |
| 2007/0106570 A1 | 5/2007 | Hartman et al. | |
| 2007/0118434 A1 | 5/2007 | Mengerink et al. | |
| 2007/0136192 A1 | 6/2007 | German et al. | |
| 2012/0191572 A1 | 7/2012 | Mengerink et al. | |
| 2013/0185118 A1 | 7/2013 | Rotman et al. | |

OTHER PUBLICATIONS

Paypal3, "The Paypal Shopping Cart Manual," Dated Aug. 22, 2002.

Paypal1, "The PayPal Shopping Cart Manual," updated Jan. 17, 2013.

Paypal2, https://web.archive.org/web/20020611072345/http://www.paypal.com/cgi-bin/webscr?cmd=p/xcl/rec/sc-techview-outside, Technical Overview, Dated Jun. 11, 2012.

Paid.com12, https://web.archive.org/web/2003410000626/http://www.rotmanauction.com. Rotman Acution Purchase Page Dated Apr. 10, 2003.

Paid.com13, "https//web.archive.org/20030810204224/http://www.auctioninc.com/auction/checkout," Auctioninc Checkout Page Dated Aug. 10, 2003.

Paid.com2, "Sales OnLine Direct's aiSeller (TM), Increases eBAY Online Auction Seller's Productivity by 50%+," PR Newswire, New York, Jun. 24, 2003, p. 1.

Paid.com3, "Sales OnLine Direct Launches Advanced Checkout System for Auctions on eBAY," PR Newswire, New York, Aug. 22, 2002, p. 1.

Paid.com4, "Sales Online Direct Introduces The First Integrated Real-Time Auction and E-Commerce Multi-Carrier Shipping Calculator, Reduces Online Shopping Cart Abandonment," PR Newswire, New York, Mar. 26, 2002, p. 1.

Paid.com5, http://web.archive.org/web/20030802025432/http://www.auctioninc.com/info/page/aiseller_tour_checkout_1, Dated Aug. 2, 2003.

Paid.com6, "http://web.archive.org/web/20030802025548/http://www.auctioninc.com/info/page/aiseller_tour_managesales_12013," Dated Aug. 2, 2013.

Paid.com7, "Sales Online Direct Expands Shipping Calculator Application," Productivity Software 16.9 (Sep. 1, 2003).

Paid.com8, "Sales Online Direct Expanding Shipping Calculator Application to e-Commerce Retailers," PR Newswire, New York, Jul. 22, 2003.

Paid.com9, "Sales Online Direct Launches AI Commerce Storefront to Offer Merchants an Easy Turnkey Solution for Creating Their Own Branded Website," PR Newswire, New York, Feb. 21, 2002.

Paid.com10, "Sales OnLine Direct's aiSeller(TM) Enhancements Expedite Online Auction Checkout Via PayPal for Buyers & Sellers; Additional Enhancements Planned for eCommerce Applications," PR Newswire, P NA, Oct. 1, 2003.

Paid.com11, http://web.archive.org/web/20040625225551/http://www.auctioninc.com, dated Jun. 25, 2004.

Paid.com1, http://web.archiv.org/web/2003080202025432, dated Aug. 3, 2003.

"U.S. Appl. No. 10/791,156, Examiner Interview Summary, dated Feb. 12, 2014," 3 pages.

"U.S. Appl. No. 10/791,156, Response Filed Apr. 11, 2014 to Final Office Action dated Nov. 14, 2013," 11 Pages.

"U.S. Appl. No. 13/011,730, Notice of Allowance dated Feb. 28, 2014," 8 pages.

"AI Seller: Sales Management Tools for Smart Sellers," [Online] Retrieved from the Internet: <URL: https://web.archive.org/web/20040625225551/http://auctioninc.com/>, (Jun. 25, 2014) 1 page.

"U.S. Appl. No. 10/791,156, Response Filed Mar. 19, 2013 to Non-Final Office Action dated Nov. 19, 2012," 10 pages.

"U.S. Appl. No. 10/791,156, Decision on Pre-Appeal Brief dated Sep. 30, 2013," 2 Pages.

"U.S. Appl. No. 10/791,156, Examiner Interview Summary dated Dec. 24, 2013," 3 Pages.

"U.S. Appl. No. 10/791,156, Final Office Action dated May 17, 2013," 14 Pages.

"U.S. Appl. No. 10/791,156, Final Office Action dated Nov. 14, 2013," 19 Pages.

"U.S. Appl. No. 10/791.156, Pre-Appeal Brief filed Sep. 17, 2013," 5 Pages.

(56) References Cited

OTHER PUBLICATIONS

"U.S. Appl. No. 10/791,156,Supplemental Amendment filed Apr. 16, 2013",10 Pages.
"U.S. Appl. No. 13/011,730,NonFinalOfficeAction dated Jun. 3, 2013", 16Pages.
"U.S. Appl. No. 13/011,730, Response filed Apr. 16, 2013 to Non Final Office Action dated Nov. 20, 2012",23 Pages.
"U.S. Appl. No. 13/011,730,Response filed Dec. 3, 2013 to Non Final Office Action dated Jun. 3, 2013", 18 Pages.
"European Applcation Serial No. 068383405, Examination Notification Art. 94(3) dated Oct. 9, 2013", 6 Pages.
"Sales Online Direct's aiSeller(TM) Enhancements Expedite Online Auction Checkout Via PayPal for Buyers & Sellers; Additional Enhancements Planned for eCommerce Applicators", PR Newswire. (Oct. 1, 2003), 5 Pages.
"Shipping Calculator and Auction Management Solutions by AuctionInc",[Online]. Retrieved fromthe Internet: <http://web.archive.org/web/20040625225551/http://www.auctioninc.com>, (Jun. 25, 2004 ), 1 Page.
Auctioninc 1, http://web.archive.org/web/20030809092025/http://auctioninc.com/.
AuctionInc 2, "Sales Online Direct's aiSeller(TM) Increases eBay Online Auction Sellers' Productivity by 50%+",PR Newswire. NewYork: Jun. 24, 2003 1 Page.
Auctioninc 3, "Sales Online Direct Launches Advanced Checkout System for Auctions on eBay",PR Newswire. New York: Aug. 22, 2002. 1 Page.
Auctioninc 4, "Sales Online Direct Introduces The First Integrated Real-Time Auct ion and E-commerce Multi-Carrier Shipping Calculator,Reduces Online Shopping Cart Abandonment",PR Newswire. New York: Mar. 26, 2002. 1 Page.
Auctioninc 5, http://web.archive.org/web/20030802025432/http://www.auctioninc.com/info/page/aiseller_tour_checkout_1.
Auctioninc 6 http://web.archive.org/web/20030802025548/http://www.auctioninc.com/info/page/aiseller_tour_managesales_12013.
Auctioninc7,"Sales Online Direct Expands Shipping Calculator App Lication" Productivity Software 16.9 (Sep. 1, 2003).
Auctioninc8,"Sales Onl ne Direct Expanding Shipping Calculator Application to e-Commerce Retailers" PR Newswire, New York, Jul. 22, 2003.
AuctionInc.9, "Sales Online Direct Launches AI Commerce Storefront to Offer Merchants an Easy Turnkey Solution for Creating Their Own Branded Website," PR Newswire, New York, Feb. 21, 2002.
"U.S. Appl. No. 10/791,156,Advisory Action dated Oct. 9, 2012", 3 Pages.
"U.S. Appl. No. 10/791,156,Examiner Interview Summary dated Apr. 18, 2012", 3 Pages.
"U.S. Appl. No. 10/791,156,Final Office Acton dated Jul. 25, 2012",14 Pages.
"U.S. Appl. No. 10/791,156,Non Final Office Action dated Nov. 19, 2012", 14 Pages.
"U.S. Appl. No. 10/791,156,Response filed Jul. 16, 2012 to Non Final Office Action dated Apr. 18, 2012", 11 Pages.
"U.S. Appl. No. 10/791,156, Response filed Sep. 25, 2012 to Final Office Action dated Jul. 25, 2012", 10 Pages.
"U.S. Appl. No. 11/323,859 ,Appeal Decision dated Dec. 26, 2012", 9 Pages.
"U.S. Appl. No. 13/011,730,Non Final Office Action dated Nov. 20, 2012", 5 Pages.
"U.S. Appl. No. 13/011,730, Preliminary Amendment filed Jul. 5, 2012", 3 Pages.
"U.S. Appl. No. 13/470,032,Response filed Nov. 12, 2012 to Restriction Requirement dated Nov. 7, 2012", 7 Pages.
"European Application Serial No. 06838340.5,Response filed Aug. 28, 2012 to Office Action dated Apr. 27, 2012", 4 Pages.
"Agile Shopping Cart From Eastland",[Online]. Retrieved from the Internet: <URL:http://www.eastland.com/livecart/prodpage .cfm?Cat_Selected=1&SubCat_Selected=1&ProductSelected;;;EDSISWJ4.0&StartRow;;;1>, (Accessed Jun. 14, 2007), 1 Page.

"alt.publish.books", [Online]. Retrieved from the Internet: <http://groups.google.com/...hread/thread/af127803e6a7e37f/89b43d97a342be1 ?hl=en&q=paypal+sho0Dinq+cart+buy+now>, (Accessed Apr. 12, 2012), 9 Pages.
"U.S. Appl. No. 10/791,156,Advisory Action dated Feb. 28, 2006",3 Pages.
"U.S. Appl. No. 10/791,156,Advisory Action dated Mar. 21, 2007", 3 Pages.
"U.S. Appl. No. 10/791,156,Advisory Action dated Jul. 12, 2011", 2 Pages.
"U.S. Appl. No. 10/791,156,Appeal Brieffiled Jun. 14, 2007",14 Pages.
"U.S. Appl. No. 10/791,156,Decision on Pre-Appeal Brief dated May 14, 2007", 2 Pages.
"U.S. Appl. No. 10/791,156,Decision on Pre-Appeal Brief Request dated Feb. 3, 2009", 20 Pages.
"U.S. Appl. No. 10/791,156,Examiner's Answer to Appeal Brief dated Sep. 12, 2007", 7 pages.
"U.S. Appl. No. 10/791,156,Examiner's Answer to Reply Brief dated Nov. 29, 2007", 3 Pages.
"U.S. Appl. No. 10/791,156,Final Office Action dated Jan. 8, 2007", 7 Pages.
"U.S. Appl. No. 10/791,156,Final Office Action dated Apr. 28, 2011", 13 Pages.
"U.S. Appl. No. 10/791,156,Final Office Action dated Jun. 15, 2009", 11 Pages.
"U.S. Appl. No. 10/791,156,Final Office Action dated Nov. 30, 2005", 9 Pages.
"U.S. Appl. No. 10/791,156,Final Office Action dated Dec. 28, 2009", 16 Pages.
"U.S. Appl. No. 10/791,156,Non Final Office Action dated Apr. 18, 2012", 17 pgls.
"U.S. Appl. No. 10/791,156,Non Final Office Action dated Nov. 16, 2010", 15 pgls.
"U.S. Appl. No. 10/791,156,Non-Final Office Action dated Jun. 3, 2005", 10 Pages.
"U.S. Appl. No. 10/791,156,Non-Final Office Action dated Jun. 13, 2006", 9 Pages.
"U.S. Appl. No. 10/791,156,Response filed Feb. 16, 2011 to Non Final Office Action dated Nov. 16, 2010",10 Pages.
"U.S. Appl. No. 10/791,156,Response filed Mar. 8, 2007 to Final Office Action dated Jan. 8, 2007",11 Pages.
"U.S. Appl. No. 10/791,156,Response filed Apr. 28, 2010 to Final Office Action dated Dec. 28, 2009",9 Pages.
"U.S. Appl. No. 10/791,156,Response filed Jun. 28, 2011to Final Office Action dated Apr. 28, 2011",9 Pages.
"U.S. Appl. No. 10/791,156,Response filed Jul. 28, 2011 to Advisory Action dated Jul. 12, 2011", 11 Pages.
"U.S. Appl. No. 10/791,156,Response filed Sep. 6, 2005 to Non-Final Office Action dated Jun. 3, 2005",9 Pages.
"U.S. Appl. No. 10/791,156,Response filed Sep. 5, 2009 to Final Office Action dated Jun. 15, 2009", 9 Pages.
"U.S. Appl. No. 10/791,156,Response filed Oct. 13, 2006 to Non Final Office Action dated Jun. 13, 2006", 11 Pages.
"U.S. Appl. No. 10/791,248,Final Office Action dated Apr. 1, 2010", 10 Pages.
"U.S. Appl. No. 10/791,248,Final Office Action dated Dec. 24, 2008", 13 Pages.
"U.S. Appl. No. 10/791,248,Non Final Office Action dated May 21, 2009", 20 pgls.
"U.S. Appl. No. 10/791,248,Non-Final Office Action dated May 5, 2008", 3 Pages.
"U.S. Appl. No. 10/791,248,Response filed Mar. 10, 2008 to Restriction Requirement dated Jan. 8, 2008", 8 Pages.
"U.S. Appl. No. 10/791,248,Response filed Mar. 24, 2009 to Final Office Action dated Dec. 24, 2008",13 Pages.
"U.S. Appl. No. 10/791,248,Response filed Sep. 5, 2008 to Non Final Office Action dated May 5, 2008",32 Pages.
"U.S. Appl. No. 10/791,248,Response filed Nov. 23, 2009 to Non Final Office Action dated May 21, 2009",15 Pages.
"U.S. Appl. No. 10/791,248,Restriction Requirement dated Jan. 8, 2008", 7 Pages.

(56) References Cited

OTHER PUBLICATIONS

"U.S. Appl. No. 11/286,600,Examiner Interview Summary dated Jan. 13, 2009", 2 Pages.
"U.S. Appl. No. 11/286,600,Final Office Action dated Jun. 22, 2010", 12 Pages.
"U.S. Appl. No. 11/286,600 ,Final Office Action dated Oct. 6, 2008", 10 Pages.
"U.S. Appl. No. 11/286,600 ,Final Office Action daed Oct. 15, 2009", 12 Pages.
"U.S. Appl. No. 11/286,600,Non-FinalOffice Action dated Mar. 25, 2009", 12 Pages.
"U.S. Appl. No. 11/286,600,Non-Final Office Action dated Apr. 9, 2008", 9 Pages.
"U.S. Appl. No. 11/288,600,Non-Final Office Action dated Dec. 31, 2009", 16 Pages.
"U.S. Appl. No. 11/286,600,Notice of Allowance dated Sep. 15, 2010",4 Pages.
"U.S. Appl. No. 11/286,600,Response filed Jan. 6, 2009 to Final Office Action dated Oct. 6, 2008", 11 Pages.
"U.S. Appl. No. 11/286,600,Response filed Mar. 29, 2010 to Non Final Office Action dated Dec. 31, 2009", 14 pqs.
"U.S. Appl. No. 11/286,600,Response filed Jun. 25, 2009 to Non-Final Office Action Mar. 25, 2009",15 pqs.
"U.S. Appl. No. 11/286,600,Response filed Jul. 9, 2008 to Non-Final Office Action dated Apr. 9, 2008",23 pqs.
"U.S. Appl. No. 11/286,600,Response filed Aug. 28, 2010 to Final Office Action dated Jun. 22, 2010",4 Pages.
"U.S. Appl. No. 11/286,600,Response filed Nov. 13, 2009 to Final Office Action dated Oct. 15, 2009", 13 Pages.
"U.S. Appl. No. 11/323,859, Advisory Action dated Jun. 23, 2010", 3 Pages.
"U.S. Appl. No. 11/323,859,Appeal Brieffiled Sep. 7, 2010",31 Pages.
"U.S. Appl. No. 11/323,859,Examiner's Answer to Appeal Brief dated Dec. 9, 2010", 15 Pages.
"U.S. Appl. No. 11/323,859,Final Office Action dated Apr. 7, 2010", 15 Pages.
"U.S. Appl. No. 11/323,859,Non Final Office Action dated Oct. 1, 2009", 15 pgls.
"U.S. Appl. No. 11/323,859,Reply Brieffiled Jan. 26, 2011",4 Pages.
"U.S. Appl. No. 11/323,859,Response filed Jan. 4, 2010 to Non Final Office Action dated Oct. 1, 2009", 18 Pages.
"U.S. Appl. No. 11/323,859,Response filed Jun. 4, 2010 to Final Office Action dated Apr. 7, 2010", 18 Pages.
"Buildhg a Drag-and-Drop Shopping Cart with AJAX", [Online], Retrieved from the Internet: <URL:http//br.sys-con.com/read/172585_ohtm>, (Accessed Jun. 14, 2007), 5 Pages.
"CCNow FAQ—Frequently Asked Questions",[Online]. Retrieved from the Internent: <http://web.arch ive.org/web/20020421175029/ http://www.ccnow.com/faq.html, (Accessed Apr. 12, 2012), 13 Pages.
"CCNow FAQ—Service Details", [Online]. Retrieved from the Internet: <http://web.archive.org/web/200206011 05503/httpt/www. ccnow.com/detail.html>, (Accessed Apr. 11, 2012) ,9 Pages.
"Drag and Drop Shopping Cart",[Online]. Retrieved from the Internet: <URL:http://students.cs.byu.edu/-ikrein/ajax lab/aiax cart. php>, (Accessed Jun. 14, 2007), 1Page.
"European Application Serial No. 06838340.5,Extended European Search Report dated Sep. 20, 2010", 4 Pages.
"European Application Serial No. 06838340.5,Response filed Apr. 20, 2011 to EP Search Report dated Sep. 20, 2010", 15 Pages.
"European Application Serial No. 068383405.5.OfficeAction dated Apr. 27, 2012",5Pages.
"International Application Serial No. PCT/US2004/037356, International Preliminary Report on Patentability dated May 26, 2006",6 Pages.
"International Application Serial No. PCT/US2004/037356, International Search Report dated Jul. 14, 2005", 3 Pages.
"International Application Serial No. PCT/US2004/037356, Written Opinion dated Jul. 14, 2005",4 Pages.
"International Application Serial No. PCT/US2006/045317, International Preliminary Report on Patentability dated Apr. 2, 2009",5 Pages.
"International Application Serial No. PCT/US2006/045317, International Search Report dated Jun. 18, 2008", 3 Pages.
I "International Application Serial No. PCT/US2006/0453 17, Written Opinion dated Jun. 18, 2008", 3 Pages.
"Microsoft Computer Dictionary, Fifth Edition",circa 2002, (2002), 2 Pages.
AZAMSHARP , "Browser Compatible Drag and Drop Shopping Cart", [Online]. Retrieved from the Internet: <URL:http://gridviewguy. com/articledetails.aspx?art icleid=236>, (Accessed Jun. 14, 2007), 10 Pages.
"U.S. Appl. No. 10/791,156, Final Office Action dated Jul. 25, 2012," 14 Pages.

\* cited by examiner

INTEGRATING THIRD PARTY SHOPPING CART APPLICATIONS WITH AN ONLINE PAYMENT SERVICE

RELATED APPLICATIONS

This application is a continuation of U.S. application Ser. No. 13/470,032, filed May 11, 2012, which in turn is a continuation of U.S. application Ser. No. 10/791,156, filed Mar. 1, 2004, which claims priority to U.S. Provisional Application No. 60/520,173, filed on Nov. 14, 2003, the disclosures of which are incorporated herein by reference in their entirety.

FIELD OF THE INVENTION

The present invention relates generally to the field of e-commerce and, more specifically, to integrating third party shopping cart applications with an online payment service.

BACKGROUND OF THE INVENTION

The Internet has become the world's market place. Merchants are increasingly selling products and services via various online commerce facilities such as merchant web sites, online auctions, etc. On merchant web sites, products are typically sold using the "shopping cart" model that allows a customer to select an item from an electronic catalog and then metaphorically adds the selected item to a shopping cart. When the customer is done selecting items, the customer requests that the items in the shopping cart be "checked out". At this point, a payment transaction is initiated, and the purchaser is asked to provide billing information such as a credit card number and other confidential information. Typically, merchants use customized shopping cart applications for providing a shopping cart flow and an independent online payment service (e.g., PayPal®) for handling payment transactions.

A large number of merchants offer their products via various online marketplaces, which often support a number of price-setting mechanisms (e.g., auctions). Different auction management tools (AMTs) have been developed to assist sellers in managing their items posted on various online auctions. AMTs usually send notifications to winning bidders. A winning bidder can then access the checkout flow using a link in the winning bidder notification and proceed with the payment. Typically, AMTs allow their users to make payments via an independent online payment service (e.g., PayPal®) that is trusted by the users for its secure, fast and easy-to-use operation.

SUMMARY OF THE INVENTION

According to one aspect of the present invention, detailed information concerning items placed by a user in a virtual shopping cart hosted by a merchant web site is received from a third party shopping cart application. The detailed information is sent by the third party shopping cart application in response to a user request to proceed with a payment for the items. Once the detailed information is received, the user is presented with one or more user interfaces facilitating processing of the payment. The user interfaces allow the user to view the content of the virtual shopping cart.

BRIEF DESCRIPTION OF THE DRAWINGS

The present invention is illustrated by way of example and not limitation in the figures of the accompanying drawings, in which like references indicate similar elements and in which:

FIGS. 4-8 illustrate exemplary user interfaces (UIs) presented to a user by an online payment service, according to one embodiment of the present invention.

DETAILED DESCRIPTION

A method and system for integrating third party shopping cart applications with an online payment service are described. In the following description, for purposes of explanation, numerous specific details are set forth in order to provide a thorough understanding of the present invention. It will be evident, however, to one skilled in the art that the present invention may be practiced without these specific details.

Third Party Shopping Carts

Figure 1:
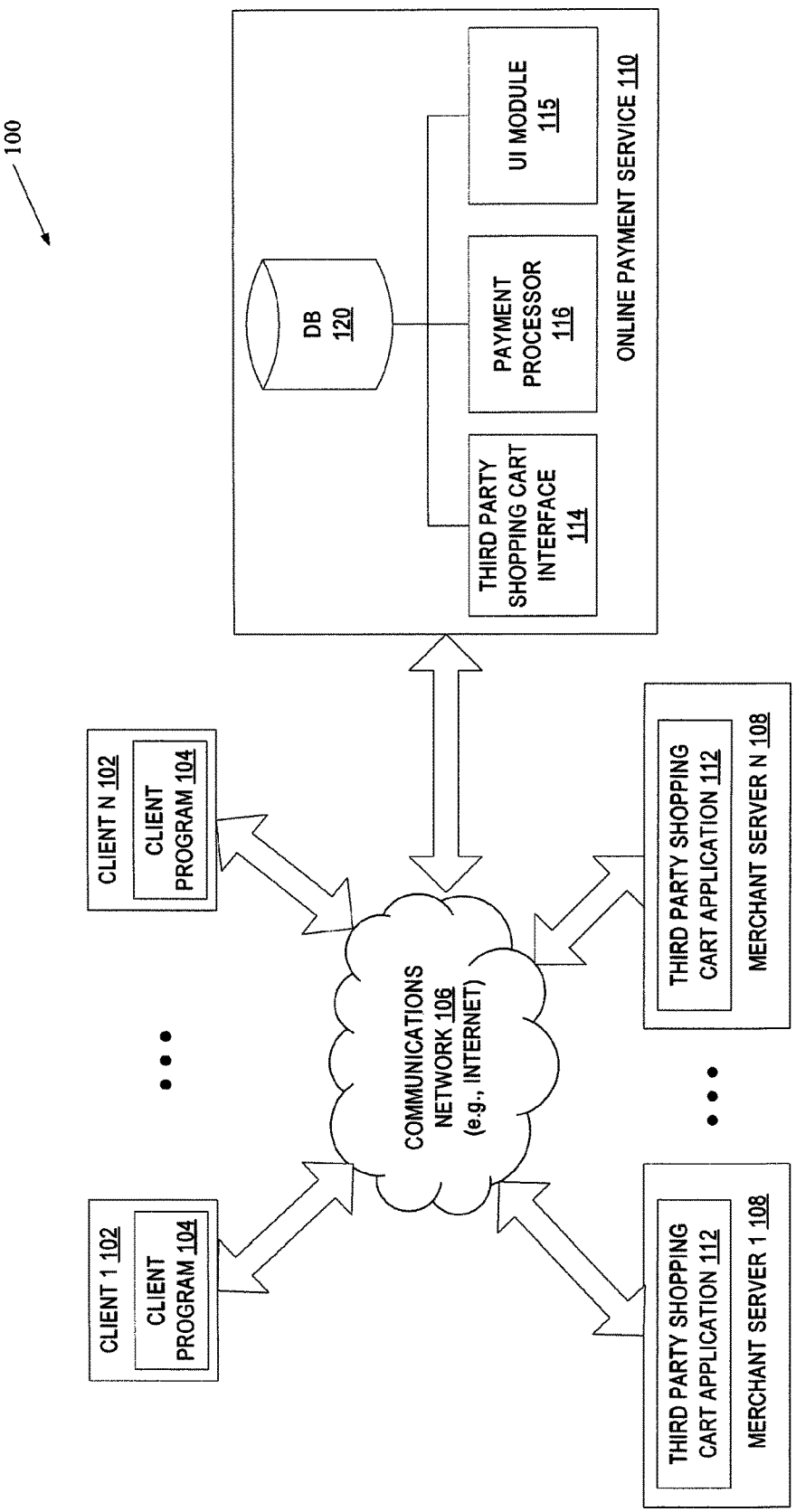
FIG. 1 is a block diagram of one embodiment of a system for processing online payment transactions initiated via merchant web sites.

FIG. 1 is a block diagram of one embodiment of a system 100 for processing online payment transactions initiated via merchant web sites. The system 100 includes multiple client computers (clients 1 through N) 102 coupled to multiple merchant servers (servers 1 through N) 112 and an online payment service 110 via a communications network 106, including a wide area network such as the Internet. Other examples of the communications network 106 may include a local area network (LAN), a wireless network (e.g., a cellular network), or the Plain Old Telephone Service (POTS) network.

The client 102 includes a client program 104, such as a browser (e.g., the Internet Explorer distributed by Microsoft Corp. of Redmond, Wash.) that executes on the client 102 and accesses the merchant server 108 and the online payment service 110.

The merchant server 108 supports a merchant web site that can be a retailer or wholesaler web site visited by various buyers including the users of the clients 102. The merchant web site uses a third party shopping cart application 112 that places items, selected by a buyer via the merchant web site, in a virtual shopping cart. A third shopping cart application 112 is an application external to the online payment service 110 that is developed by an external developer/company to allow a merchant or another third party to host a shopping cart on its web site. The shopping cart hosted by a merchant or any other third party is referred to herein as a third party shopping cart.

The merchant servers 108 are coupled to the online payment service 110 via the communications network 106. The online payment service 110 facilitates processing of online payment transactions between buyers of the merchant web sites 108 and the merchants. In one embodiment, the online payment service 110 includes interfaces to external processors to process payment transactions of corresponding types. In another embodiment, the online payment service 110 includes an internal payment processing system.

In one embodiment, the online payment service 110 is invoked by the third party shopping cart application 112 each time a buyer submits a request to proceed with the payment for items placed in a shopping cart hosted by a merchant web site. The buyer request may be submitted when the buyer clicks the checkout button on the merchant web site or performs some other predefined operation. Once the online payment service 110 is invoked, it presents to the buyer a set of user interfaces (UIs) that facilitate the processing of the payment while allowing the buyer to view the contents of the shopping cart for which the payment is being made.

In one embodiment, the online payment service 110 includes a third party shopping cart interface 114, a payment processor 116, a UI module 115, and a database 120. The third party shopping cart interface 114 is responsible for receiving, from the third party shopping cart application 112, detailed information about the items placed by the buyer in the shopping cart hosted by the merchant website and storing the detailed information in the database 120. The detailed information may include, for each item in the shopping cart, the item name, the item number, the item price, the item quantity, and various other data.

The payment processor 116 is responsible for collecting the buyer's personal information via UIs generated by the UI module 115, facilitating the processing of the buyer's payment for the items in the shopping cart, and informing the buyer that the payment has been sent to the merchant. The UIs presented to the buyer allow the buyer to view the contents of the shopping cart while the buyer's payment is being processed. Once the payment transaction is completed, it is reflected in the transaction history maintained by the online payment service 110 for each of the buyer and the merchant. When the buyer or the seller accesses his or her transaction history, this payment transaction appears as a standard payment transaction initiated via the online payment service 100.

Thus, embodiments of the present invention enable complete integration of the third party shopping cart applications 112 with the online payment service 110. As a result, merchants can seamlessly combine on their web sites customized shopping car applications, which provide additional means for promoting merchants' products, with an independent online payment service that is widely used and trusted by many users.

Figure 2:
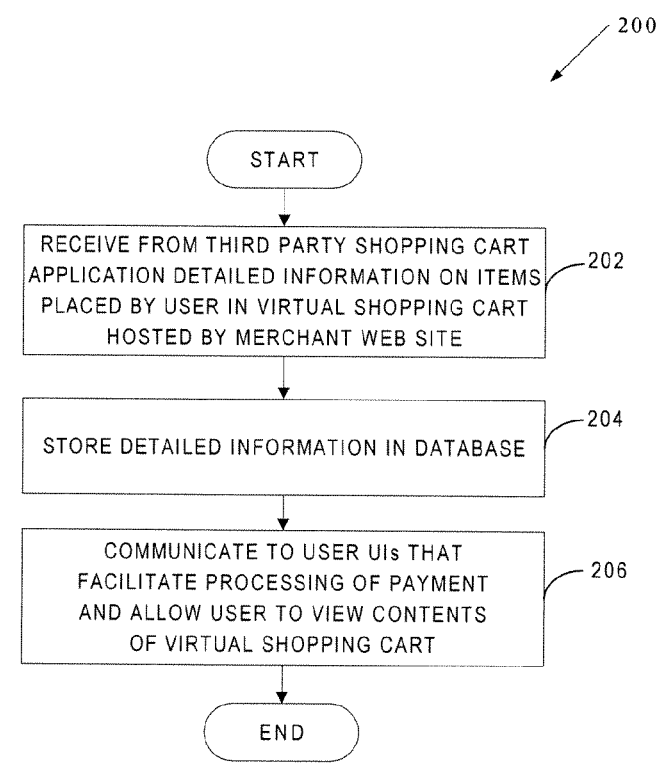
FIG. 2 is a flow diagram of one embodiment of a method for processing a payment transaction initiated by a third party shopping cart application.

FIG. 2 is a flow diagram of one embodiment of a method 200 for processing a payment transaction initiated by the third party shopping cart application 112. The method 200 may be performed by processing logic, which may comprise hardware, software, or a combination of both. Processing logic resides in the online payment service 110.

Referring to FIG. 2, the method 200 begins with the third party shopping cart interface 114 receiving from the third party shopping cart application 112 detailed information on items placed by a user in a virtual shopping cart hosted by the merchant web site (processing block 202). The third party shopping cart application 112 sends the detailed information in response to a user request to proceed with the payment for the items in the virtual shopping cart. The user request may be submitted when the user clicks the checkout button on the merchant web site or performs some other predefined operation.

At processing block 204, the third party shopping cart interface 114 stores the detailed information in the database 120. The detailed information may include, for each item, the item name, the item number, the item price, the item quantity, etc.

At processing block 206, the payment processor 116 communicates to the user via the communications network 106 a set of UIs that facilitate processing of the user payment and allow the user to view the contents of the virtual shopping cart.

In one embodiment, all payment transactions initiated via merchant web sites are marked using a designated flag. The number of times the flag is passed through, and the dollar volume, are stored to monitor the usage of the integrated third party shopping carts. In one embodiment, a system administrator may request to view all payment transactions initiated via merchant web sites. Upon receiving a request from an administrator, the online payment service 110 presents to the administrator an administrator transaction details UI that lists all payment transactions initiated via merchant web sites as third party shopping cart payments and includes a table with third party shopping cart contents. The administrator can also request a report on the number and dollar volume of transactions that involve third party shopping carts.

Figure 3:
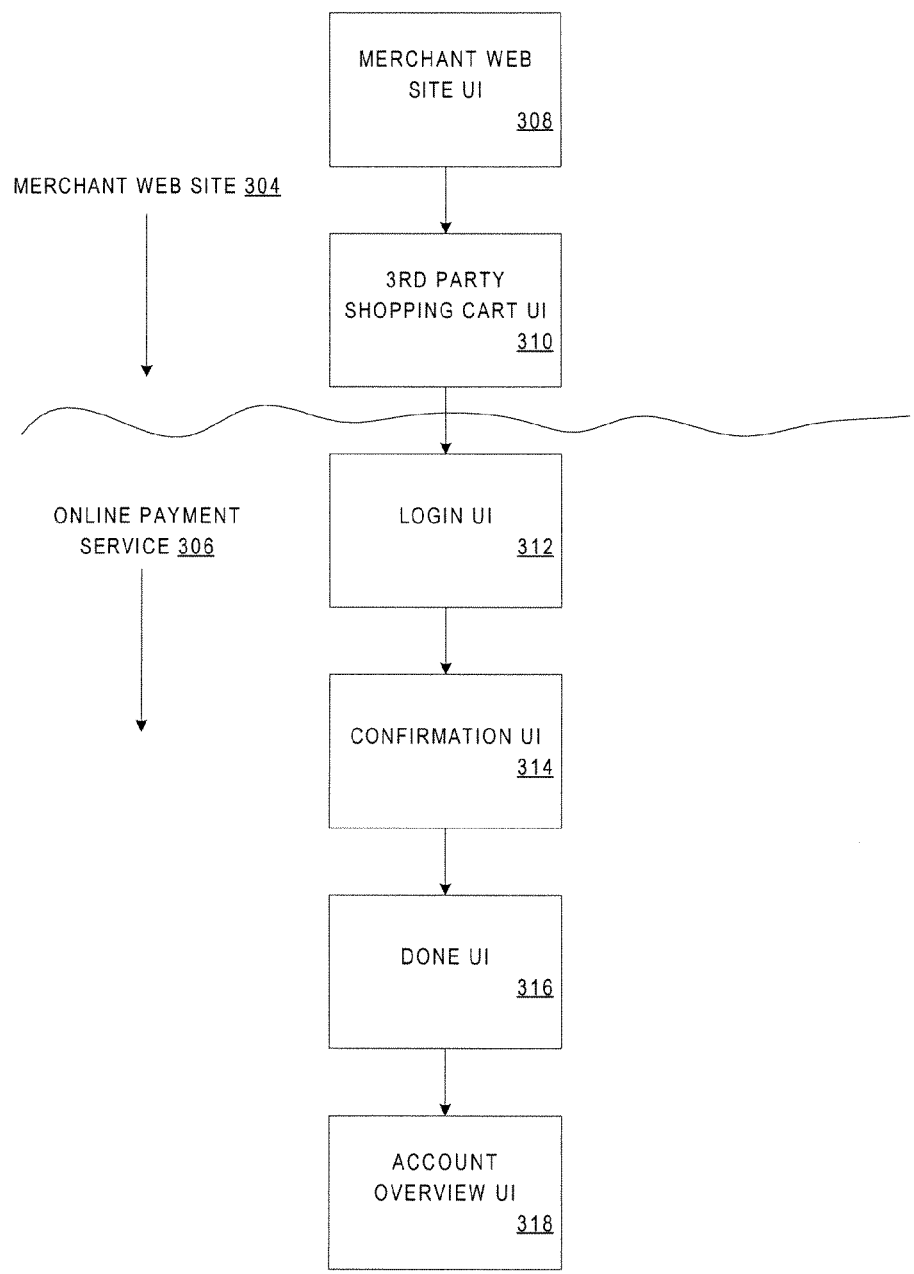
FIG. 3 illustrates an exemplary flow of UIs presented to a user of an online payment service, according to one embodiment of the present invention.

FIG. 3 illustrates an exemplary flow of UIs presented to a user of a merchant web site, according to one embodiment of the present invention. Initially, a merchant web site 304 communicates to a user a merchant web site UI 308 that allows the user to view the items offered by the merchant. The user can order any of these items by clicking an associated "add to cart" button. Once the user is done with selecting the items, a third party shopping cart application running on the merchant web site 304 presents to the user a third party shopping cart UI 310 that display the contents of the shopping cart and allows the user to request a checkout of the selected items. When the user requests the checkout (e.g., by clicking the checkout button), a transition to the online payment service 306 is made.

During the transition, the online payment service 306 receives and stores information identifying the content of the virtual shopping cart. This information may include, for example, item names, item numbers, item prices, quantities, option data (option names and values) for each item, etc. In one embodiment, this information may result from user purchases via a single merchant web site. Alternatively, this information may result from user purchases via multiple merchant web sites associated with a single receiving account (e.g., a ticket company allowing a user to buy tickets via web sites of different ticket holders).

Upon the transition, the online payment service 306 enables the user to review the shopping cart contents on various screens generated by the online payment service 306. In particular, once the user requests the checkout, the online payment service 306 presents a login UI 312 that asks the user to sign-in (if the user is new to the online payment service 306) or login (if the user is an existing user of the online payment service 306), and allows the user to view the content of the shopping cart (e.g., by displaying the content of the shopping cart or including a link to a screen displaying the content of the shopping cart). Once the user provides the requested information, the online payment service 306 presents to the user a confirmation UI 314 that displays the details of the payment transaction and asks the user to confirm the payment. The confirmation UI 314 also allows the user to view the content of the shopping cart (e.g., by displaying the content of the shopping cart or including a link to a screen displaying the content of the shopping cart). If the user confirms the payment, the online payment service 306 presents to the user a done UI 316 informing the user that the payment has been sent to the merchant. After that, the user may either be returned to the merchant's website 304 or be presented with an account overview UI 318 that shows this payment transaction as part of the user's transaction history. The account overview UI 318 allows the user to view the content of the shopping cart to which the payment transaction belongs (e.g., by displaying the content of the shopping cart or including a link to a screen displaying the content of the shopping cart).

FIGS. 4-8 illustrate exemplary user interfaces (UIs) presented to a user by the online payment service 306, according to one embodiment of the present invention.

Figure 4:
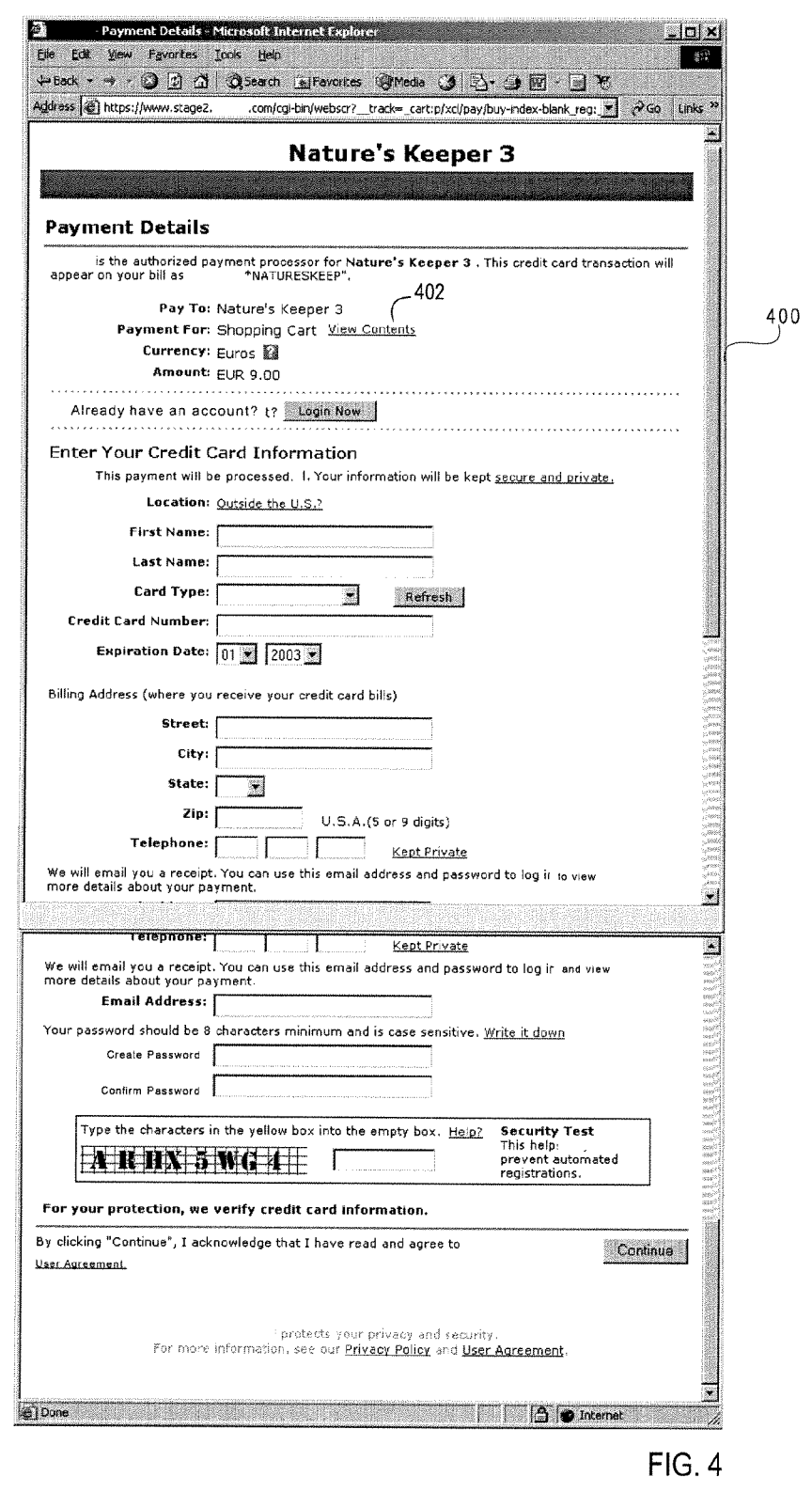

FIG. 4 illustrates an exemplary login UI 400 for a new user. The login UI 500 includes a link 402 that allows the user to view the content of the virtual shopping cart.

Figure 5:
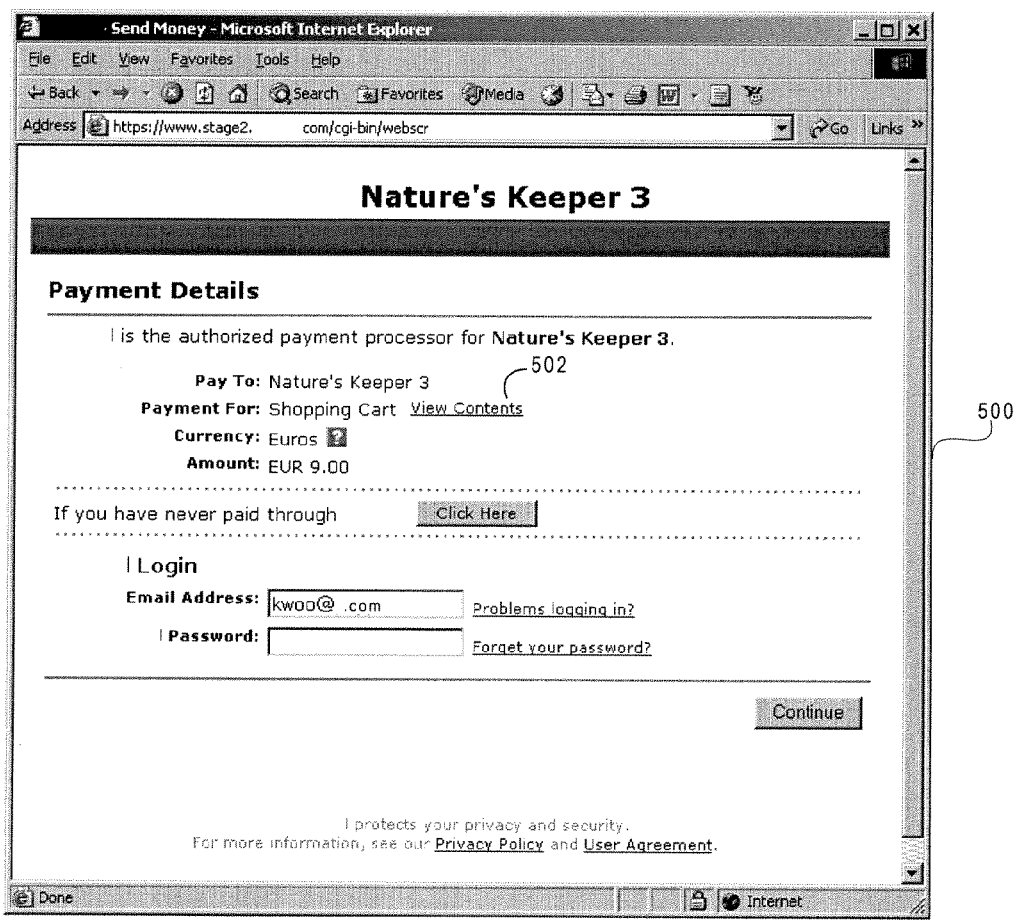

FIG. 5 illustrates an exemplary login UI 500 for an existing user. The login UI 500 includes a link 502 that allows the user to view the content of the virtual shopping cart.

Figure 6:
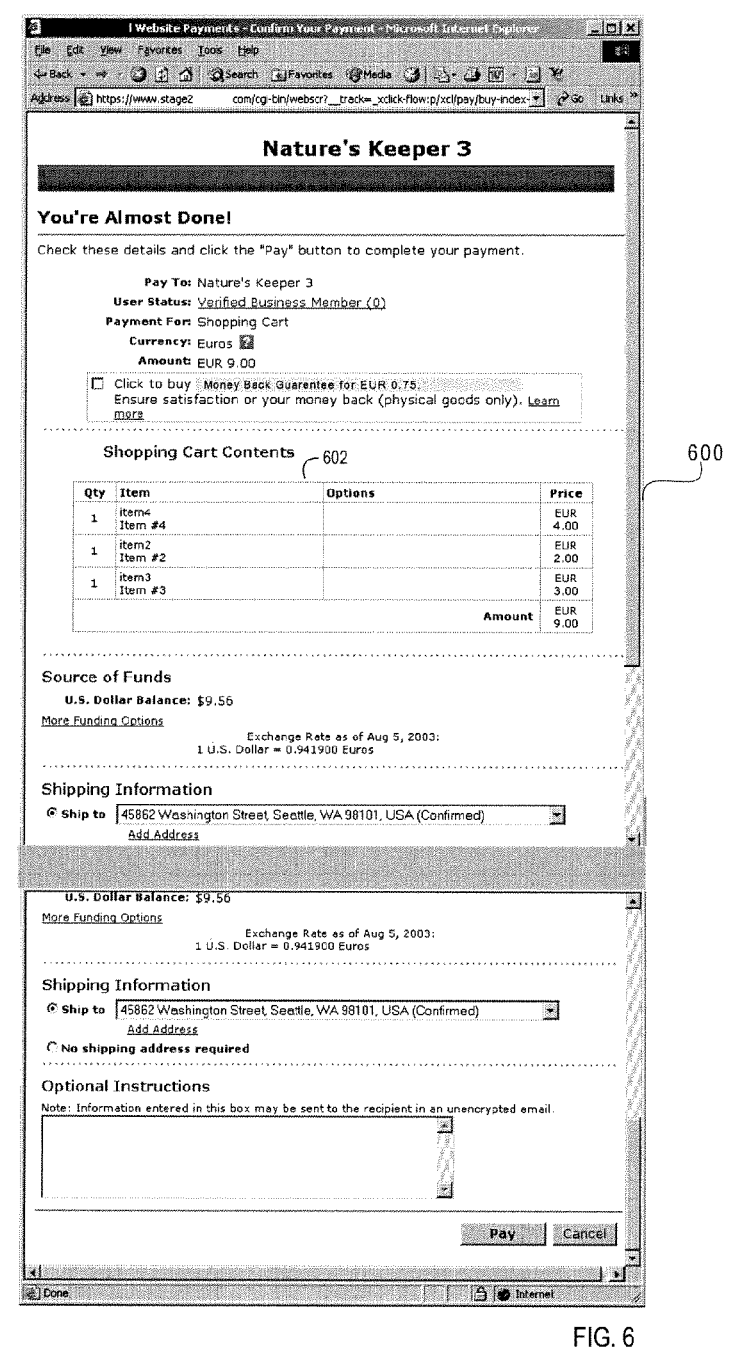

FIG. 6 illustrates an exemplary confirmation UI 600 that provides payment details and requests the user to confirm the payment. The confirmation UI 600 displays the shopping cart contents 602.

Figure 7:
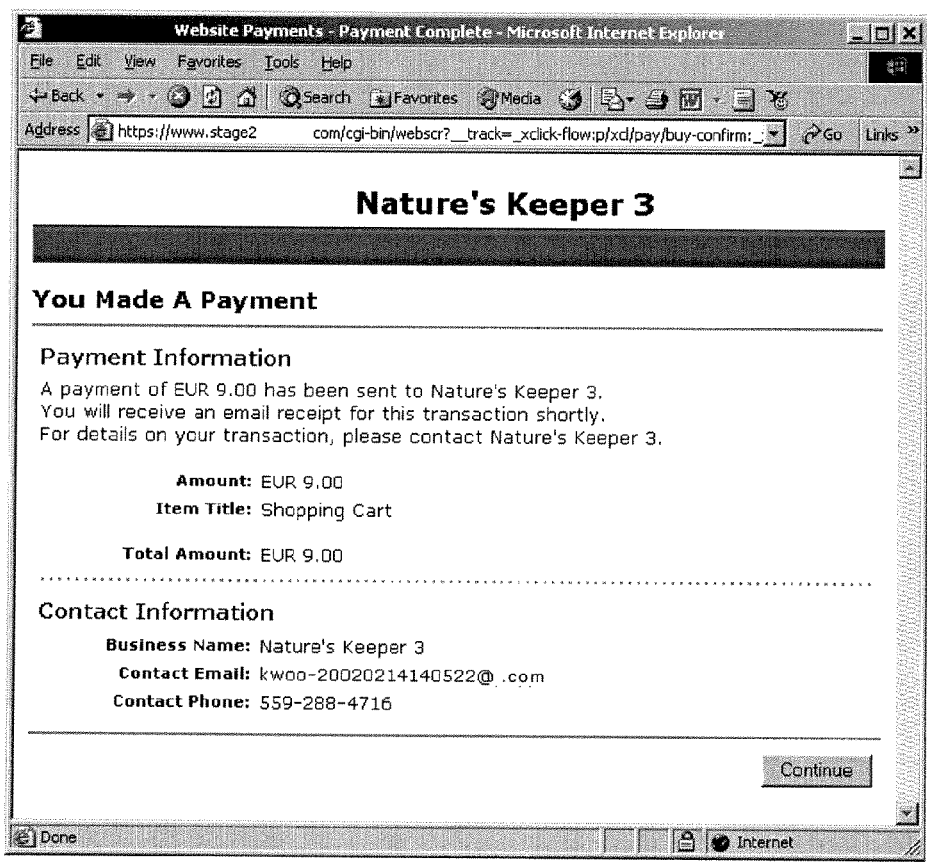

FIG. 7 illustrates an exemplary done UI 700 that informs the user that the payment has been sent to the merchant.

Figure 8:
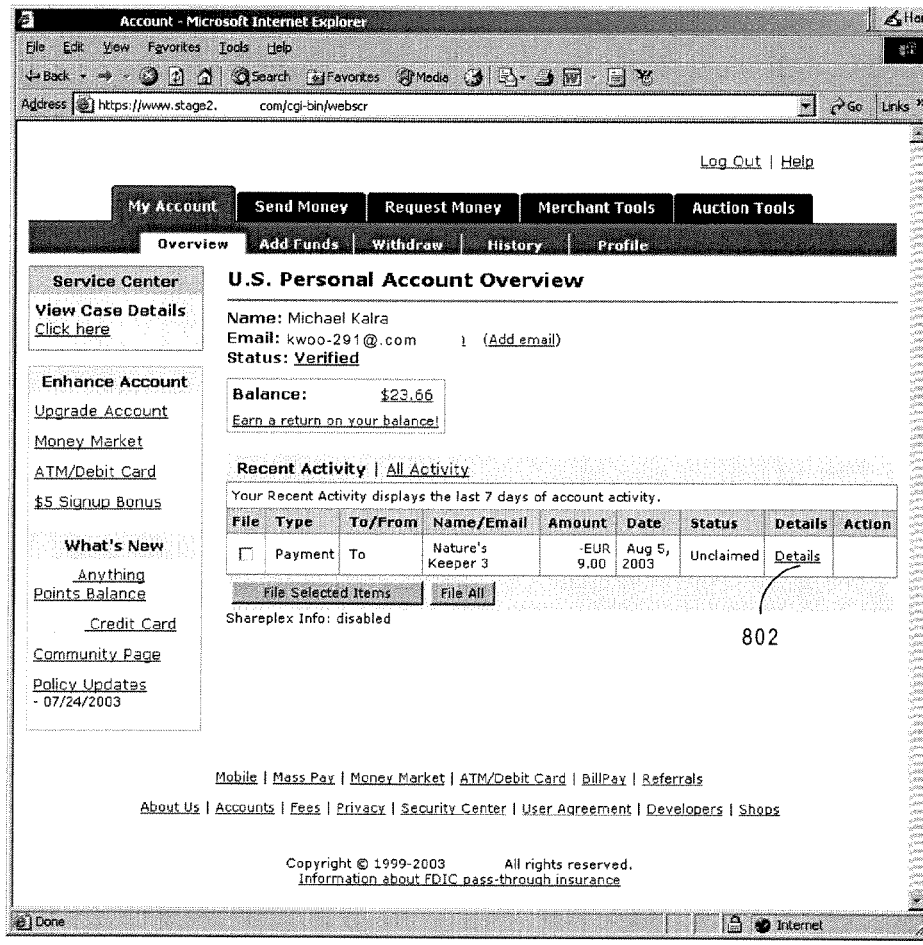

FIG. 8 illustrates an exemplary account history UI 800 that displays recent transaction activity of the user, including the above payment transaction. The account history UI 800 includes a link 802 that allows the user to view the content of the virtual shopping cart.

AMT Shopping Carts

Figure 9:
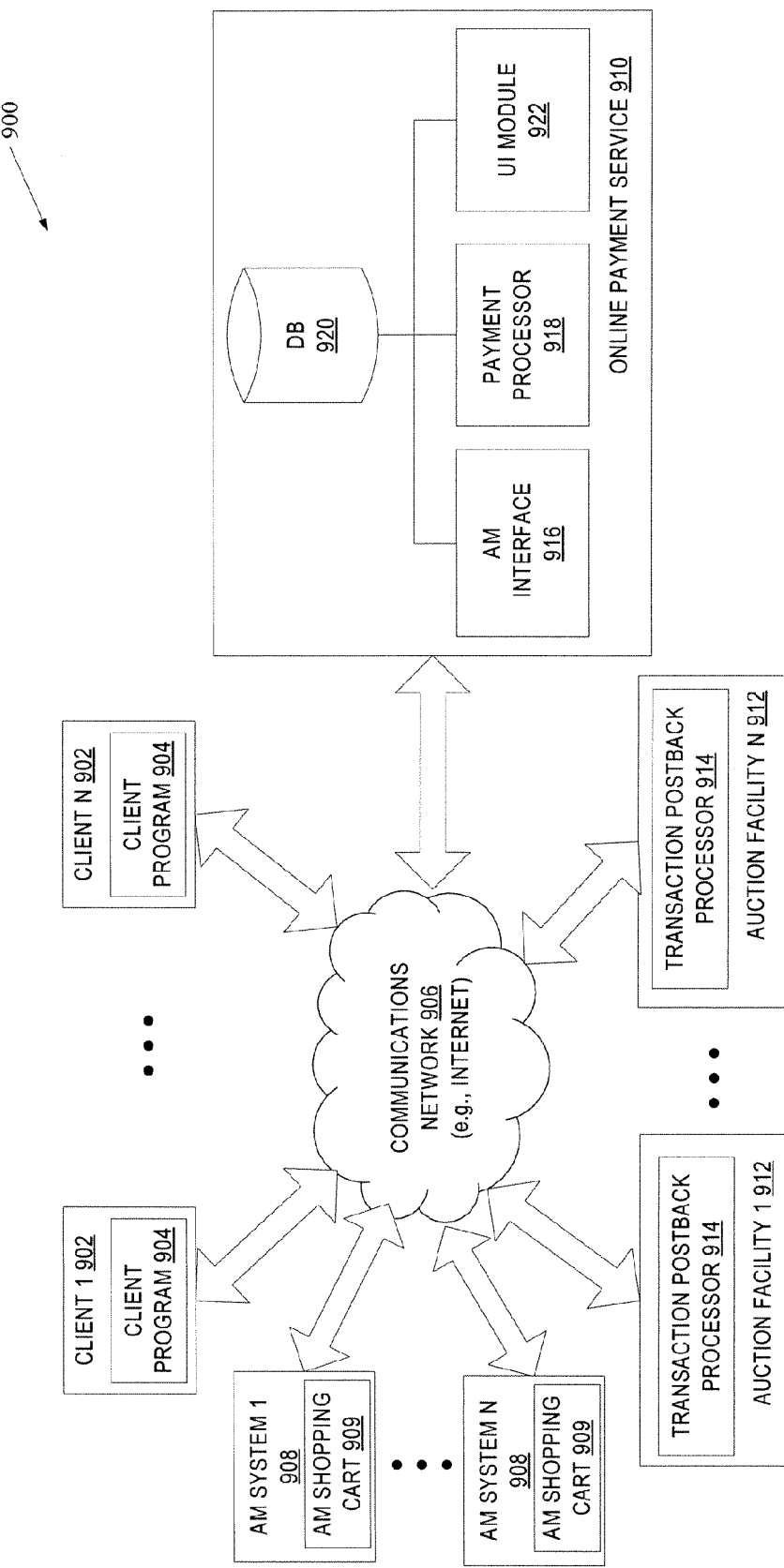
FIG. 9 is a block diagram of one embodiment of a system for processing online payment transactions initiated via auction management tools (AMTs).

FIG. 9 is a block diagram of one embodiment of a system 900 for processing online payment transactions initiated via auction management tools (AMTs). The system 900 includes multiple client computers (clients 1 through N) 902, multiple AMT systems (AMT systems 1 through N) 908, multiple online auction facilities (auction facilities 1 through N) 112, and an online payment service 110.

The client 902 includes a client program 904, such as a browser (e.g., the Internet Explorer distributed by Microsoft Corp. of Redmond, Wash.) that executes on the client 102 and accesses the AMT systems 908 via a communications network 906, including a wide area network such as the Internet. Other examples of the communications network 106 may include a local area network (LAN), a wireless network (e.g., a cellular network), or the Plain Old Telephone Service (POTS) network.

The AMT system 908 provides to vendors an online tool for managing their sales on various network-based commerce facilities (e.g., online auction facilities 912, retailer or wholesaler facilities, etc.) represented by commerce web sites visited by various buyers including the users of the clients 902. The AMT system 908 provides the shopping cart flow for items ordered from merchant web sites, auction facilities 912, or any other commerce facilities on which merchants' sales are managed by the AMT system 908. Once a buyer selects an item on a merchant web site or wins a bid at an auction facility 912, the AMT system 908 places a relevant item in a virtual shopping cart (referred to herein as an AMT shopping cart 909).

The AMT systems 908 are coupled to the online payment service 910 via the communications network 906. The online payment service 910 facilitates online payment transactions between various users. In one embodiment, the online payment service 110 includes interfaces to external processors to process payment transactions of corresponding types. In another embodiment, the online payment service 110 includes an internal payment processing system.

In one embodiment, the online payment service 910 is invoked by the AMT system 908 each time the AMT system 908 receives an indication of the buyer's intent to proceed with the payment for the contents of the AMT shopping cart 909. The buyer request may be submitted when the buyer clicks a designated link or button (e.g., the link identifying the online payment service, the checkout button, the add to cart button, etc.) or performs some other predefined operation. Once the online payment service 910 is invoked, it presents to the buyer a set of user interfaces (UIs) that facilitate the processing of the payment while allowing the buyer to view the contents of the AMT shopping cart 909 for which the payment is being made. If the payment transaction completes successfully, the online payment service 910 identifies shopping cart items from auction facilities 912 and communicates with the auction facilities 912 via the communications network 906 to inform the auction facilities 912 about the payment.

Each auction facility 912 includes a transaction postback processor 914 that marks auction transactions pertaining to the shopping cart items as paid.

In one embodiment, the online payment service 910 includes an AMT interface 916, a payment processor 918, a UI module 922, and a database 920. The AMT interface 916 is responsible for receiving, from the AMT 908, detailed information about the items in the AMT shopping cart 909 and storing the detailed information in the database 920. The detailed information may include, for each item in the shopping cart, the item name, the item number, the item price, the item quantity, and various other data. In addition, for each item from the auction facilities 912, the detailed information may include, for example, the specifier of the auction facility 912, the buyer ID within the auction facility 912, the transaction number within the auction facility 912, etc.

The payment processor 918 is responsible for collecting the buyer's personal information via UIs generated by the UI module 922, facilitating the processing of the buyer's payment for the items in the shopping cart, and informing the buyer that the payment has been sent to the seller. The UIs presented to the buyer allow the buyer to view the contents of the shopping cart while the buyer's payment is being handled. Once the payment transaction is completed, it is reflected in the transaction history maintained by the online payment service 910 for each of the buyer and the seller. When the buyer or the seller accesses his or her transaction history, this payment transaction appears as a standard payment transaction initiated via the online payment service 100.

In one embodiment, the payment processor 918 is also responsible for identifying which auction facilities have items in the shopping cart and informing those auction facilities about the payment.

Thus, embodiments of the present invention enable complete integration of the AMTs 908 with the online payment service 910 and involved auction facilities 912, transferring transaction information between these different systems in real time and allowing users to access the transaction information in each of those systems in real time.

Figure 10:
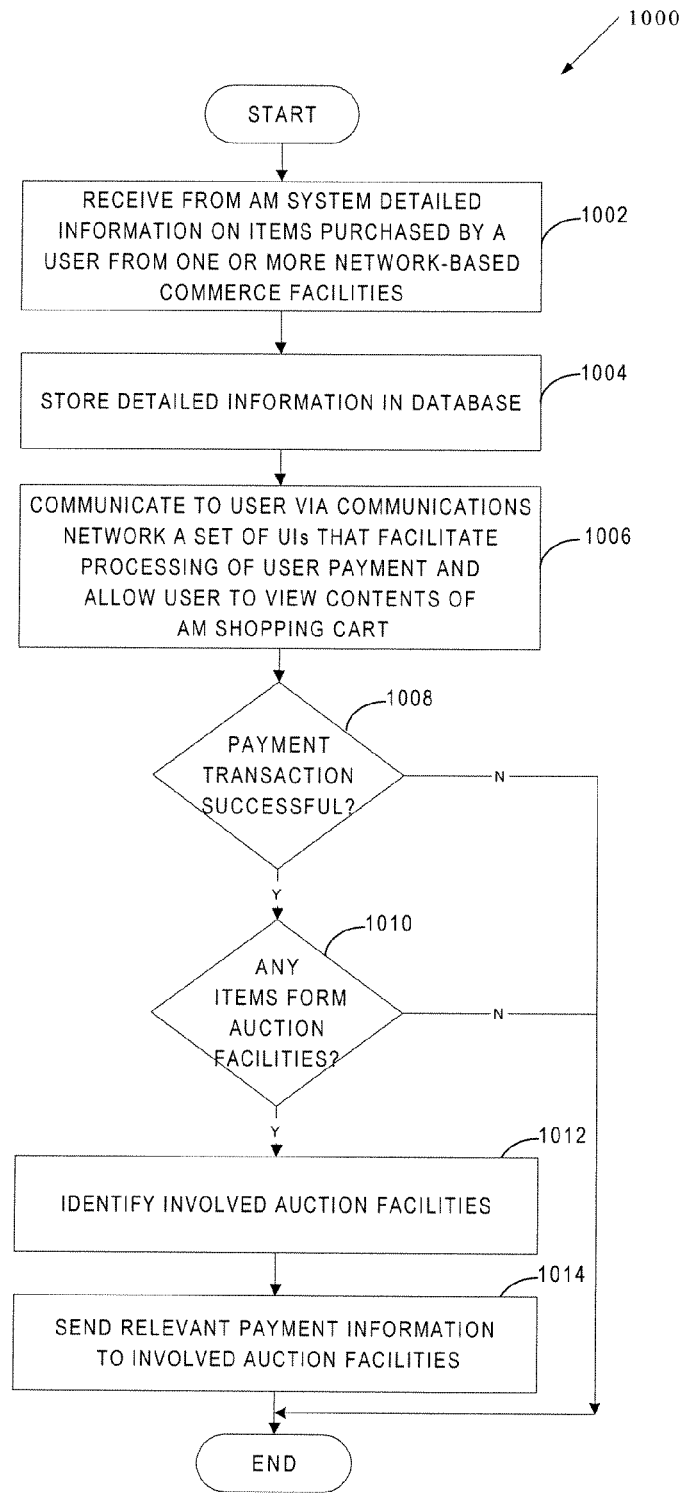
FIG. 10 is a flow diagram of one embodiment of a method for processing a payment transaction initiated by the AMT.

FIG. 10 is a flow diagram of one embodiment of a method 1000 for processing a payment transaction initiated by the AMT 908. The method 1000 may be performed by processing logic, which may comprise hardware, software, or a combination of both. Processing logic resides in the online payment service 910.

Referring to FIG. 10, the method 1000 begins with the AMT interface 916 receiving from the AMT system 908 detailed information on items purchased by a user from one or more network-based commerce facilities (processing block 1002). The items purchased by the user are placed by the AMT system 908 in the AMT shopping cart 909. AMT system 908 sends the detailed information on the items to the online payment service 910 in response to receiving an indication of the user intent to proceed with the payment for the items in the virtual shopping cart. The indication of the user intent may be received when the user clicks a designated button or link on the AMT web site (e.g., the link identifying the online payment service 910, the checkout button, the add-to-cart button, etc.) or performs some other predefined operation.

At processing block 1004, the AMT interface 916 stores the detailed information in the database 920. For each item purchased from a merchant web site, the detailed information may include, for example, the item name, the item number, the item price, the item quantity, etc. For each item purchased from an auction facility 912, the detailed information may include, for example, the specifier of the auction facility 912, the buyer ID within the auction facility 912, the transaction number within the auction facility 912, the item number within the auction facility 912, the item name, the item price, the item quantity, etc.

At processing block 1006, the payment processor 918 communicates to the user via the communications network 906 a set of UIs that facilitate processing of the user payment and allow the user to view the contents of the AMT shopping cart.

At decision box 1008, the payment processor 918 determines whether the payment transaction is successful. If not, the method 1000 ends. If so, the payment processor 918 determines whether any items in the AMT shopping cart are from an auction facility 912 (decision box 1010). If not, the method 1000 ends. If so, the payment processor 918 identifies involved auction facilities (processing block 1012) and sends relevant payment information to the involved auction facilities (processing block 1014). This payment information may include the buyer ID within the auction facility, the transaction number within the auction facility, the item number within the auction facility, the payment amount, the item price, the item quantity, etc. The auction facilities then use this payment information to mark the relevant auction transactions accordingly (e.g., as paid, payment pending, etc.).

In one embodiment, all payment transactions initiated via AMTs 908 are marked using a designated flag. The counter specifying the number of times the flag is passed through and the dollar volume are stored to monitor the usage of the integrated AMT shopping carts. In one embodiment, the counter and dollar volume are maintained for each auction facility 912 to allow the auction facility 912 to compare the dollar volume associated with transactions initiated via the AMTs with the dollar volume associated with transactions initiated directly via the auction facility 912.

In one embodiment, the system administrator may request to view all payment transactions initiated via AMT shopping carts. Upon receiving a request from an administrator, the online payment service 110 presents to the administrator an administrator transaction details UI that lists all payment transactions initiated via AMT shopping carts as AMT shopping cart payments and includes a table with AMT shopping cart contents. The administrator can also request a report on the number and dollar volume of transactions that involve AMT shopping carts.

Figure 11:
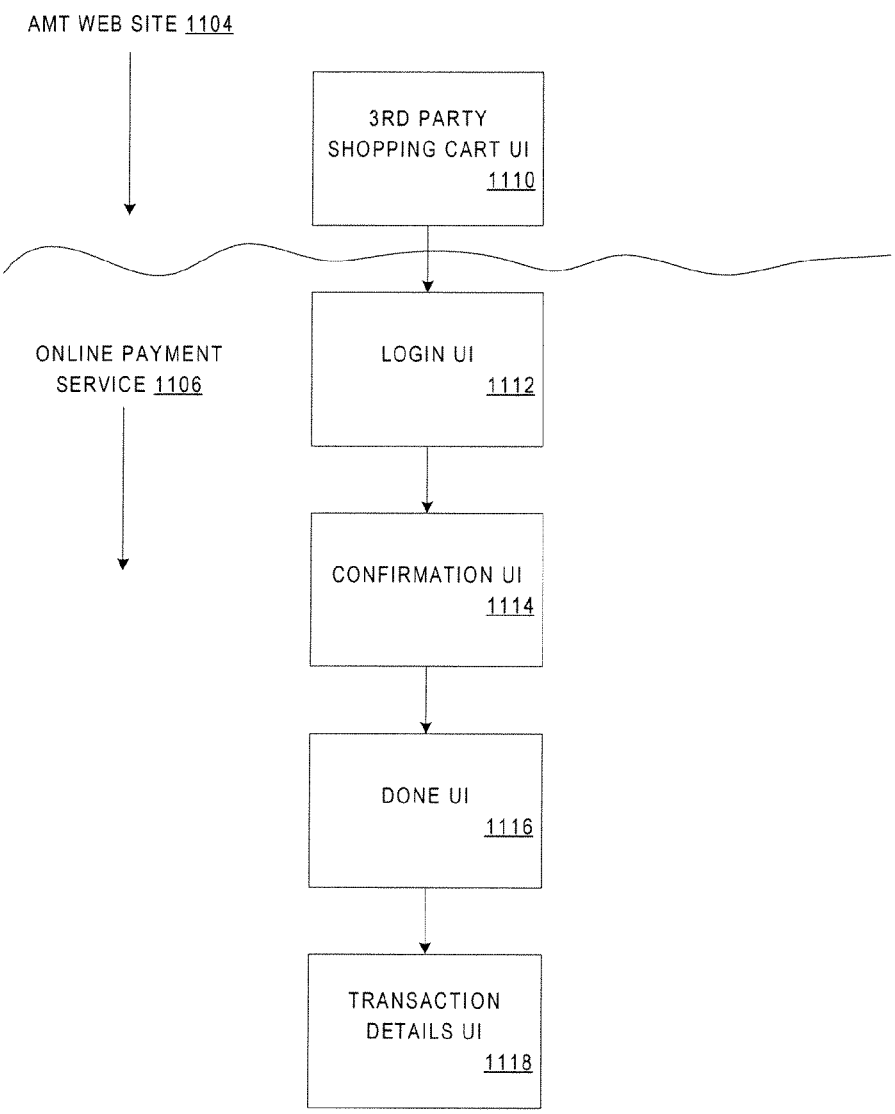
FIG. 11 illustrates an exemplary flow of UIs presented to a user of an online payment service, according to one embodiment of the present invention.

FIG. 11 illustrates an exemplary flow of UIs presented to a user, according to one embodiment of the present invention. Initially, an AMT web site 304 communicates to a user an AMT shopping cart UI 310 that displays information concerning the contents of an AMT shopping cart. A user may access the AMT shopping cart via, for example, a link in a winning bidder notification sent to the user, a designated link or button on the AMT web site 304, a button or link next to an ordered item on a corresponding merchant web site or auction web site, etc.

When the user provides an indication of his or her intent to proceed with the payment for the contents of the AMT shopping cart (e.g., by clicking the checkout or add to cart button or a designated link), a transition to the online payment service 1106 is made. During the transition, the online payment service 1106 receives and stores information identifying the content of the AMT shopping cart. This information may include, for example, an auction specifier, an auction buyer ID, auction transaction IDs, auction item numbers, item names, item prices, quantities, etc. This information may result from user purchases from one or more merchant web sites and/or one or more auction facilities.

Upon the transition, the online payment service 1106 enables the user to review the shopping cart contents on various screens generated by the online payment service 1106. In particular, once the user requests the checkout, the online payment service 1106 presents a login UI 1112 that asks the user to sign-in (if the user is new to the online payment service 1106) or login (if the user is an existing user of the online payment service 1106) and allows the user to view the content of the shopping cart (e.g., by displaying the content of the shopping cart or including a link to a screen displaying the content of the shopping cart). Once the user provides the requested information, the online payment service 1106 presents to the user a confirmation UI 1114 that displays the details of the payment transaction and asks the user to confirm the payment. The confirmation UI 1114 also allows the user to view the content of the shopping cart (e.g., by displaying the content of the shopping cart or including a link to a screen displaying the content of the shopping cart). If the user confirms the payment, the online payment service 1106 presents to the user a done UI 1116 informing the user that the payment has been sent to the merchant. After that, the user is presented with a transaction details UI 1118 that shows the details of this payment transaction. The transaction details UI 1118 allows the user to view the content of the shopping cart to which the payment transaction belongs (e.g., by displaying the content of the shopping cart or including a link to a screen displaying the content of the shopping cart).

Further, the online payment service 1106 communicates payment information to the involved auction facilities. A seller can then see relevant auction transactions marked as paid on screens generated by corresponding auction facilities.

FIGS. 12-17 illustrate exemplary user interfaces (UIs) presented to a user by the online payment service 1106, according to one embodiment of the present invention.

Figure 12:
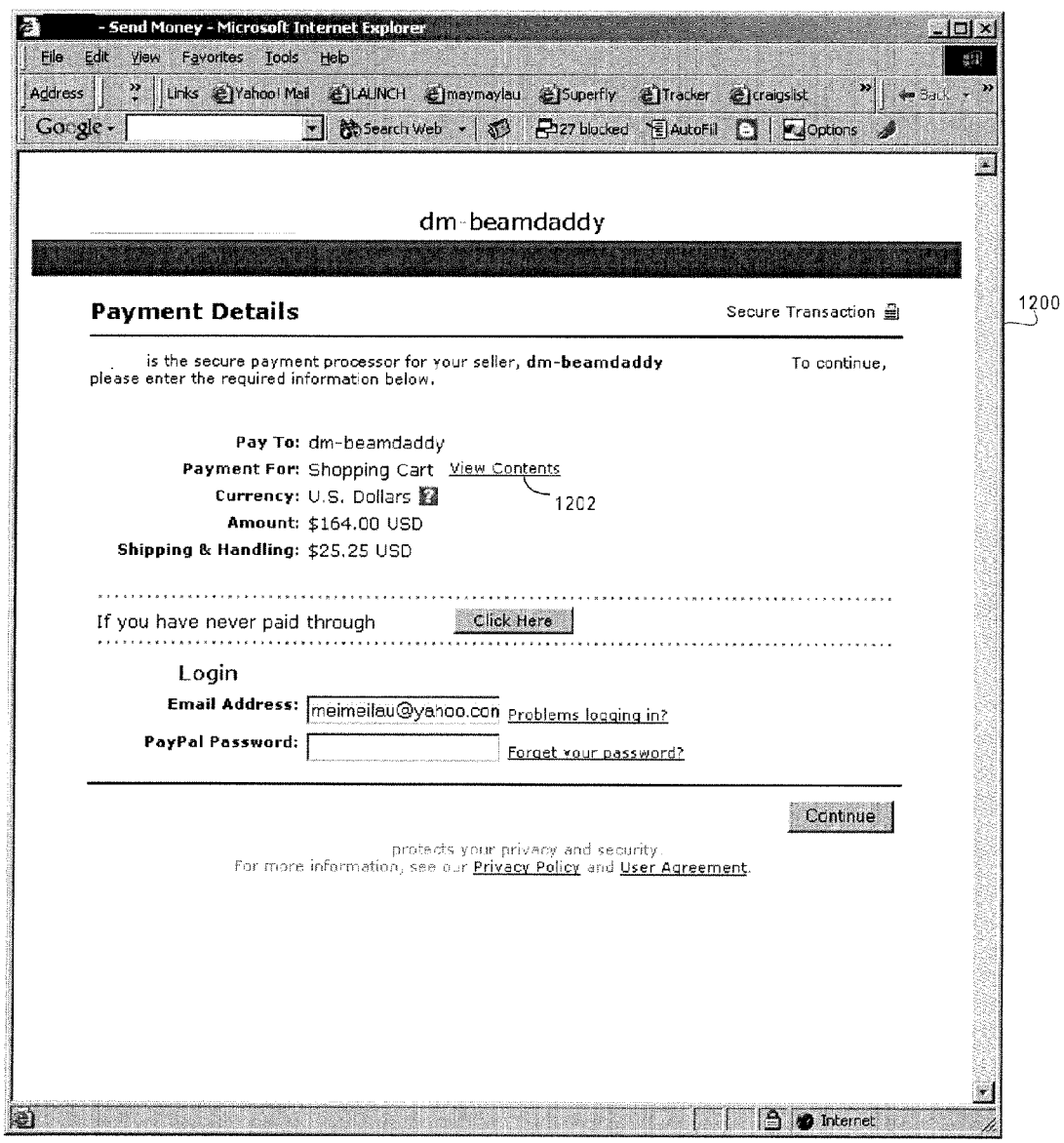
FIGS. 12-17 illustrate exemplary UIs presented to a user by an online payment service, according to one embodiment of the present invention.

FIG. 12 illustrates an exemplary login UI 1200 for an existing user. The login UI 1200 includes a link 1202 that allows the user to view the content of the AMT shopping cart.

Figure 13:
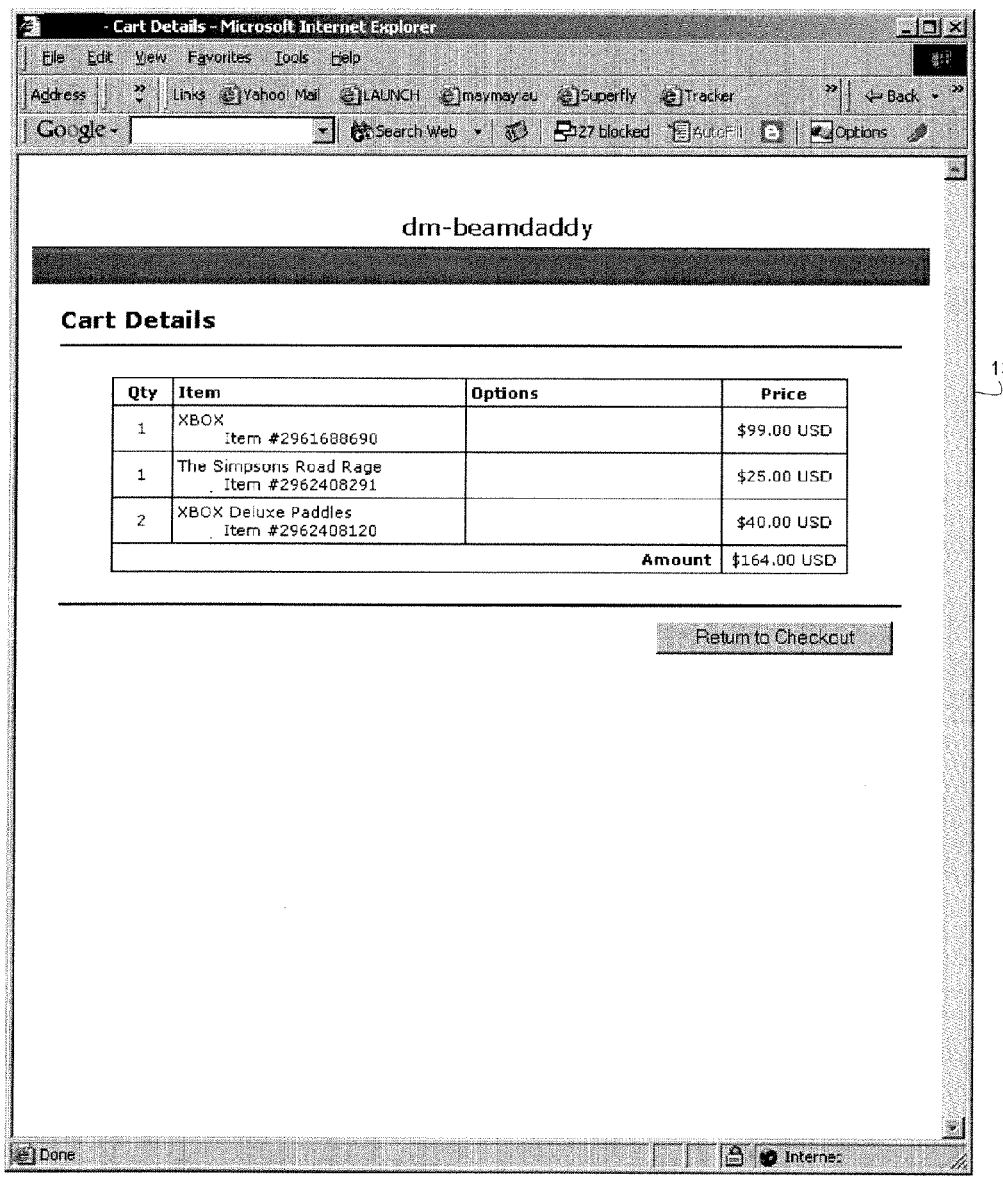

FIG. 13 illustrates an exemplary cart details UI 1300 that displays the contents of the AMT shopping cart.

Figure 14:
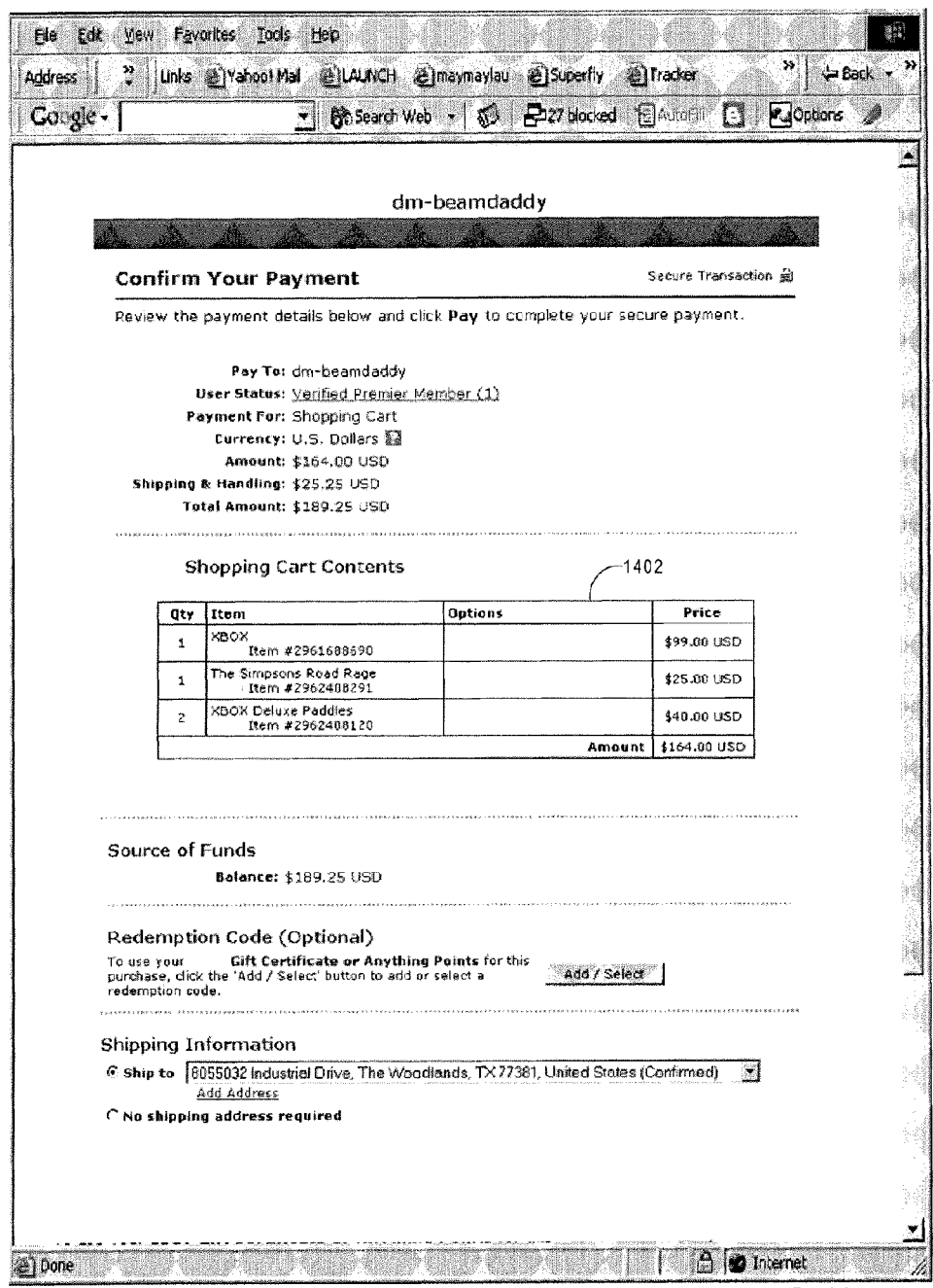
Figure 15:
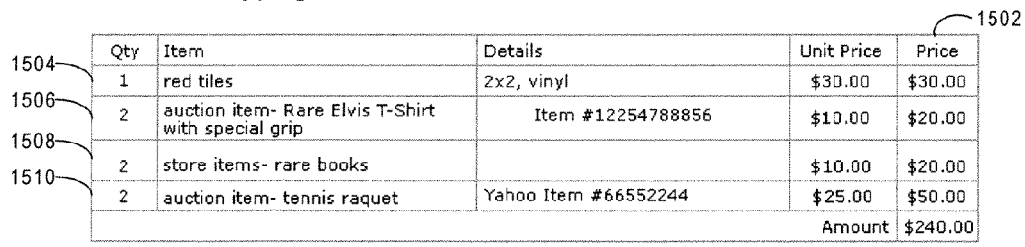

FIG. 14 illustrates an exemplary confirmation UI 1400 that provides payment details and requests the user to confirm the payment. The confirmation UI 1400 displays the shopping cart contents 1402 that include items from a single auction facility. FIG. 15 illustrates a portion of the confirmation UI with shopping cart contents 1502 in which the items are from multiple auction facilities (items 1506 and 1510) and merchant web sites (items 1504 and 1508).

Figure 16:
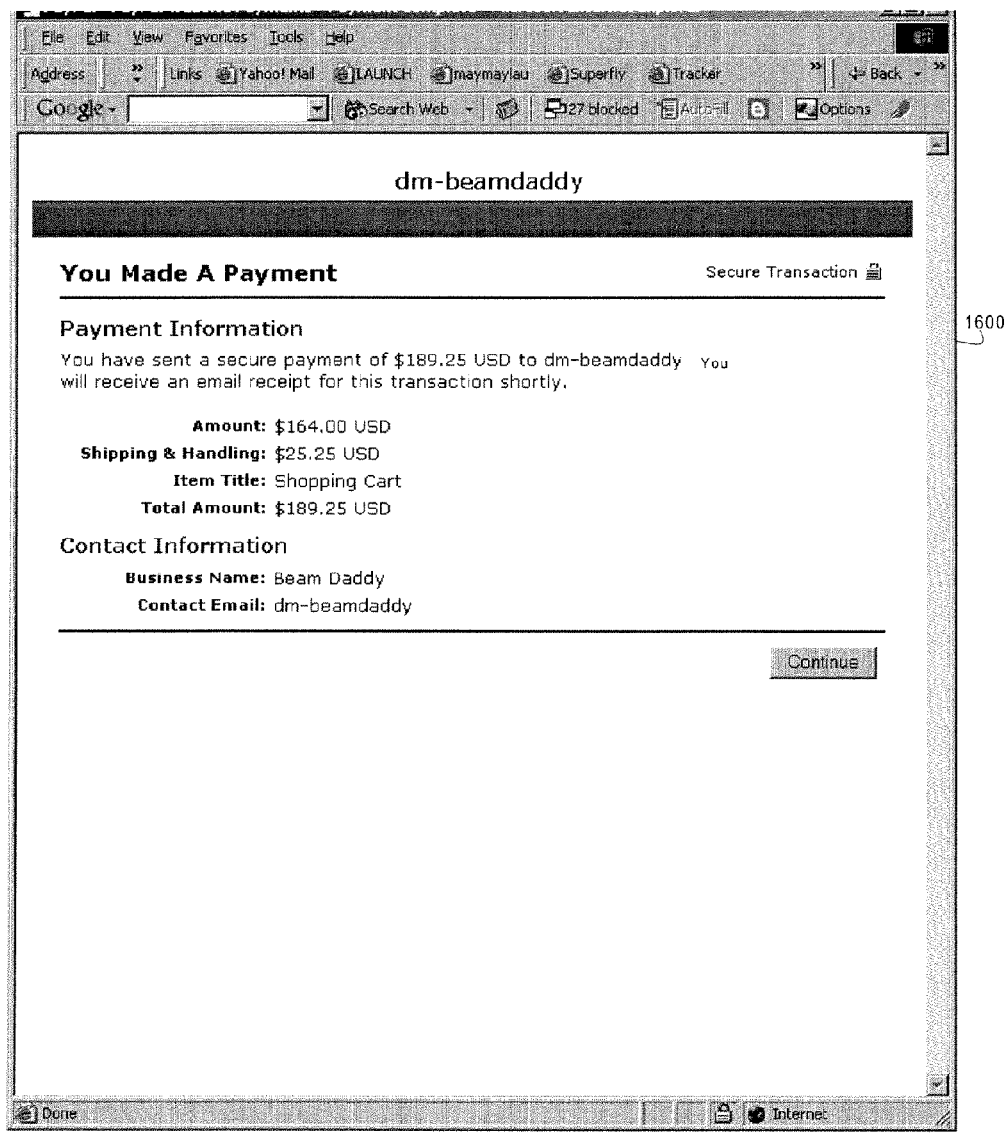

FIG. 16 illustrates an exemplary done UI 1600 which informs the user that the payment has been sent to the merchant.

Figure 17:
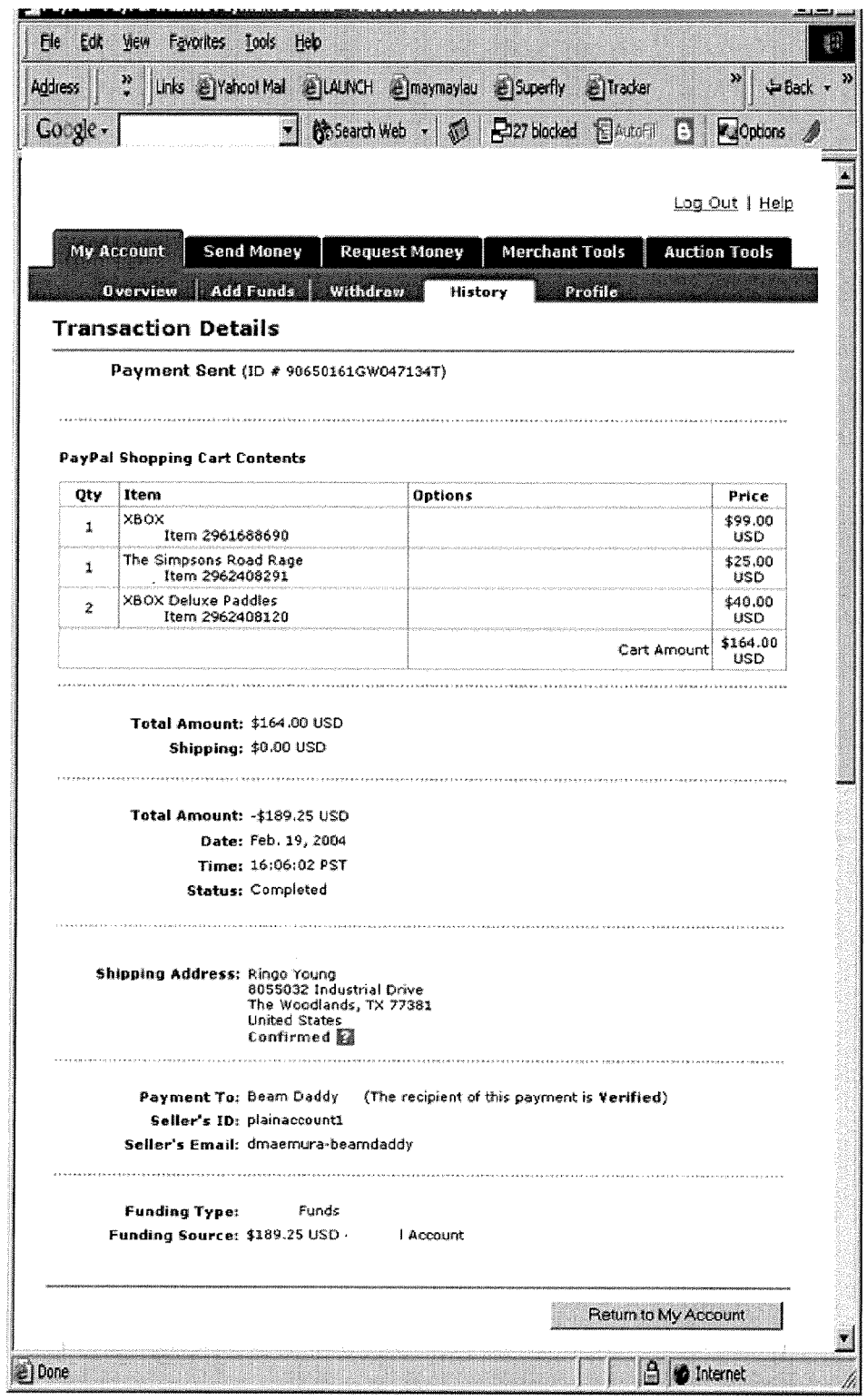

FIG. 17 illustrates an exemplary transaction details UI 1700 that displays details about the above payment transaction, including the shopping cart contents 1702.

Figure 18:
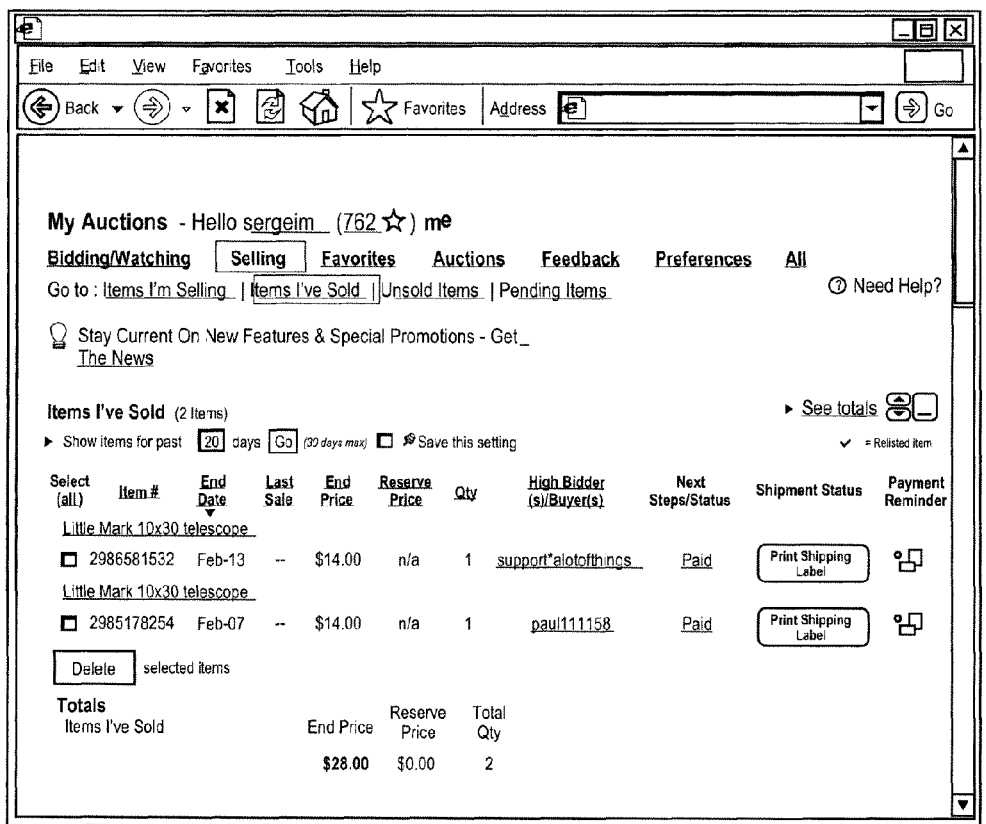
FIG. 18 illustrates an exemplary My Auctions UI presented to a user by an auction facility, according to one embodiment of the present invention.

FIG. 18 illustrates an exemplary My Auctions UI 1800 presented to a user by an auction facility, according to one embodiment of the present invention. My Auction UI 1800 displays transactions initiated via the AMT as paid based on the information provided by the online payment service 1104.

Figure 19:
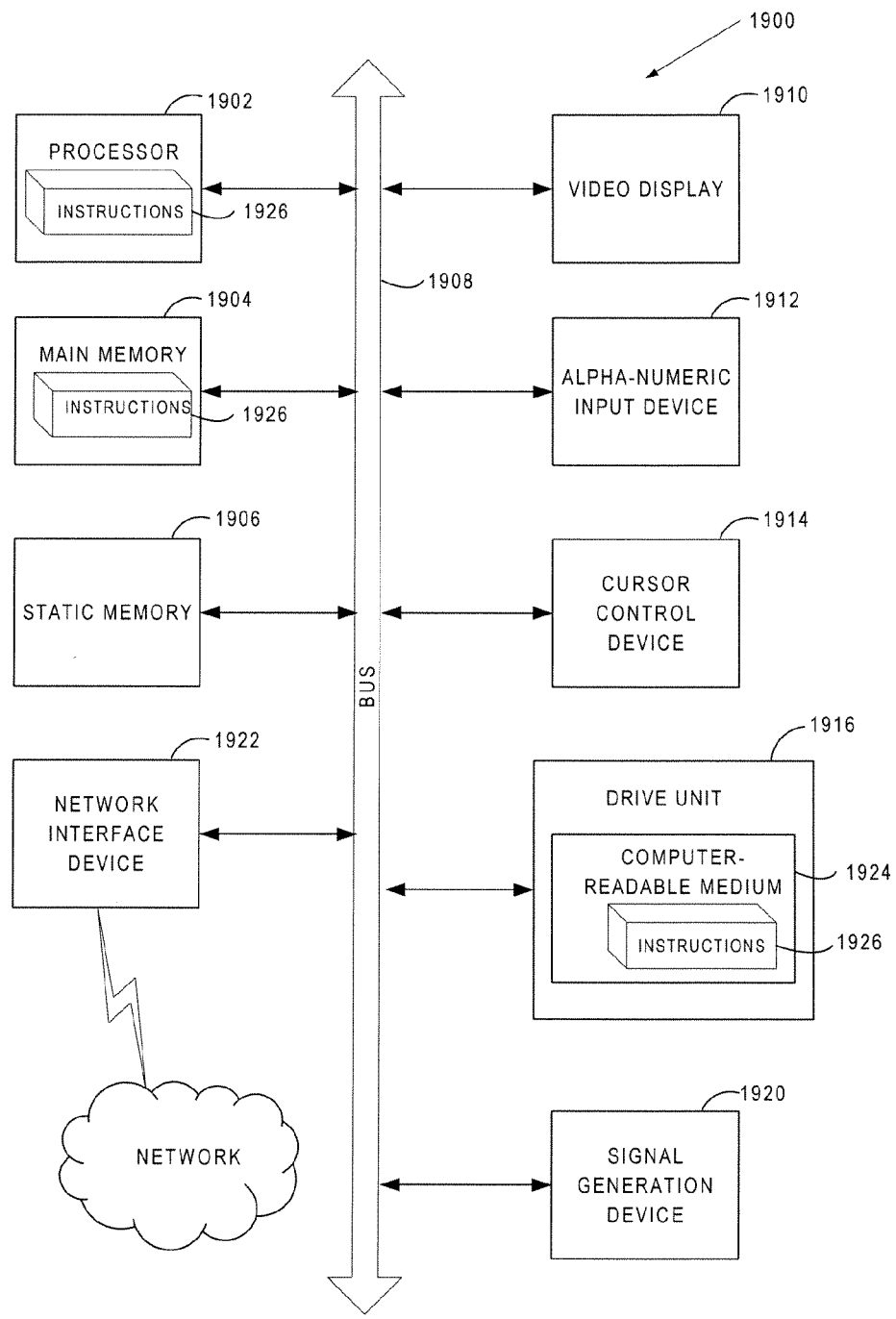
FIG. 19 is a diagrammatic representation of an exemplary computer system.

FIG. 19 shows a diagrammatic representation of a machine in the exemplary form of a computer system 1900 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1900 includes a processor 1902, a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an alpha-numeric input device 1912 (e.g. a keyboard), a cursor control device 1914 (e.g. a mouse), a disk drive unit 1916, a signal generation device 1920 (e.g. a speaker) and a network interface device 1922.

The disk drive unit 1916 includes a machine-readable medium 1924 on which is stored a set of instructions (i.e., software) 1926 embodying any one, or all, of the methodologies described above. The software 1926 is also shown to reside, completely or at least partially, within the main memory 1904 and/or within the processor 1902. The software 1926 may further be transmitted or received via the network interface device 1922. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system for integrating third party shopping cart applications with an online payment service have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A multi-merchant virtual shopping cart content display system, comprising:
    a non-transitory memory storing data that associates a user account with virtual shopping cart content for each of a plurality of virtual shopping carts that were each created with a different merchant; and
    one or more hardware processors that are coupled to the non-transitory memory and that are configured to execute instructions to cause the system to perform operations comprising:
        identifying the plurality of virtual shopping carts associated with the user account via the data stored in the non-transitory memory;
        generating and providing a graphical user interface for display on a display device, wherein the graphical user interface includes a virtual shopping cart identifier for each of the plurality of virtual shopping carts and a respective virtual shopping cart content link for each of the virtual shopping cart identifiers;
        receiving a selection of a first virtual shopping cart content link on the graphical user interface and, in response, retrieving first virtual shopping cart contents from the non-transitory memory for a first virtual shopping cart that was created with a first merchant, and providing the first virtual shopping cart content for display on the display device; and
        receiving a selection of a second virtual shopping cart content link on the graphical user interface and, in response, retrieving second virtual shopping cart content from the non-transitory memory for a second virtual shopping cart that was created with a second merchant that is different than the first merchant, and providing the second virtual shopping cart content for display on the display device.

2. The system of claim 1, wherein the virtual shopping cart content for each of the plurality of virtual shopping carts include one or more of items names of items in the virtual shopping cart, item numbers of items in the virtual shopping cart, item prices of items in the virtual shopping cart, quantities of items in the virtual shopping cart, and item options for items in the virtual shopping cart.

3. The system of claim 1, wherein the plurality of virtual shopping carts were created with the different merchants via respective merchant websites of the different merchants.

4. The system of claim 1, wherein the graphical user interface includes a respective virtual shopping cart status for each of the virtual shopping cart identifiers that identifies whether the virtual shopping cart content of the associated virtual shopping cart have been claimed.

5. The system of claim 1, wherein the graphical user interface includes a respective virtual shopping cart creation date for each of the virtual shopping cart identifiers that identifies a date on which the associated virtual shopping cart was created.

6. The system of claim 1, wherein the graphical user interface includes a respective merchant identifier for each of the virtual shopping cart identifiers that identifies merchant with which the associated virtual shopping cart was created.

7. A method for displaying virtual shopping cart contents of virtual shopping carts created with a plurality of different merchants, comprising:
   identifying, by a payment service device via data stored in a database, a plurality of virtual shopping carts that were each created with a different merchant using a user account;
   generating, by the payment service device on a display device, a graphical user interface for display that includes a virtual shopping cart identifier for each of the plurality of virtual shopping carts and a respective virtual shopping cart content link for each of the virtual shopping cart identifiers;
   receiving, by the payment service device, a selection of a first virtual shopping cart content link on the graphical user interface and, in response, retrieving first virtual shopping cart content from the database for a first virtual shopping cart that was created with a first merchant, and providing the first virtual shopping cart content for display on the display device; and
   receiving, by the payment service device, a selection of a second virtual shopping cart content link on the graphical user interface and, in response, retrieving second virtual shopping cart content from the database for a second virtual shopping cart that was created with a second merchant that is different than the first merchant, and providing the second virtual shopping cart content for display on the display device.

8. The method of claim 7, wherein the virtual shopping cart content for each of the plurality of virtual shopping carts include one or more of items names of items in the virtual shopping cart, item numbers of items in the virtual shopping cart, item prices of items in the virtual shopping cart, quantities of items in the virtual shopping cart, and item options for items in the virtual shopping cart.

9. The method of claim 7, wherein the plurality of virtual shopping carts were created with the different merchants via respective merchant websites of the different merchants.

10. The method of claim 7, wherein the graphical user interface includes a respective virtual shopping cart status for each of the virtual shopping cart identifiers that identifies whether the virtual shopping cart content of the associated virtual shopping cart have been claimed.

11. The method of claim 7, wherein the graphical user interface includes a respective virtual shopping cart creation date for each of the virtual shopping cart identifiers that identifies a date on which the associated virtual shopping cart was created.

12. The method of claim 7, wherein the graphical user interface includes a respective merchant identifier for each of the virtual shopping cart identifiers that identifies merchant with which the associated virtual shopping cart was created.

13. The method of claim 7, further comprising:
   receiving, by the payment service device, the first virtual shopping cart content and an identifier for the user account from a first merchant device of the first merchant, and storing the first virtual shopping cart contents in the database in association with the user account; and
   receiving, by the payment service device, the second virtual shopping cart content and an identifier for the user account from a second merchant device of the second merchant, and storing the second virtual shopping cart contents in the database in association with the user account.

14. A non-transitory machine-readable medium having stored thereon machine-readable instructions executable to cause a machine to perform operations comprising:
   identifying, via data stored in a storage system, a plurality of virtual shopping carts that were each created with a different merchant using a user account, and that are each associated with virtual shopping cart content in the storage system;
   generating, for display on a display device, a graphical user interface that includes a virtual shopping cart identifier for each of the plurality of virtual shopping carts and a respective virtual shopping cart content link for each of the virtual shopping cart identifiers;
   receiving, from an input device, a selection of a first virtual shopping cart content link on the graphical user interface and, in response, retrieving first virtual shopping cart content from the storage system for a first virtual shopping cart that was created with a first merchant, and providing the first virtual shopping cart content for display on the display device; and
   receiving, from the input device, a selection of a second virtual shopping cart content link on the graphical user interface and, in response, retrieving second virtual shopping cart content from the storage system for a second virtual shopping cart that was created with a second merchant that is different than the first merchant, and providing the second virtual shopping cart content for display on the display device.

15. The non-transitory machine-readable medium of claim 14, wherein the virtual shopping cart contents for each of the plurality of virtual shopping carts include one or more of items names of items in the virtual shopping cart, item numbers of items in the virtual shopping cart, item prices of items in the virtual shopping.

16. The non-transitory machine-readable medium of claim 14, wherein the plurality of virtual shopping carts were created with the different merchants via respective merchant websites of the different merchants.

17. The non-transitory machine-readable medium of claim 14, wherein the graphical user interface includes a respective virtual shopping cart status for each of the virtual shopping cart identifiers that identifies whether the virtual shopping cart content of the associated virtual shopping cart have been claimed.

18. The non-transitory machine-readable medium of claim 14, wherein the graphical user interface includes a respective virtual shopping cart creation date for each of the virtual shopping cart identifiers that identifies a date on which the associated virtual shopping cart was created.

19. The non-transitory machine-readable medium of claim 14, wherein the graphical user interface includes a respective merchant identifier for each of the virtual shopping cart identifiers that identifies merchant with which the associated virtual shopping cart was created.

20. The non-transitory machine-readable medium of claim 14, wherein the operations further comprise:
   receiving, through a network, the first virtual shopping cart content and an identifier for the user account from a first merchant device of the first merchant, and storing the first virtual shopping cart content in the storage system in association with the user account; and
   receiving, through the network, the second virtual shopping cart content and an identifier for the user account from a second merchant device of the second merchant, and storing the second virtual shopping cart content in the storage system in association with the user account.

\* \* \* \* \*